US011910390B2

(12) United States Patent
Bhattad et al.

(10) Patent No.: US 11,910,390 B2
(45) Date of Patent: Feb. 20, 2024

(54) UPLINK (UL) TRANSMISSION CAPABILITY

(71) Applicant: QUALCOMM INCORPORATED, San Diego, CA (US)

(72) Inventors: Kapil Bhattad, Bangalore (IN); Ananta Narayanan Thyagarajan, Bangalore (IN); Tanumay Datta, Bangalore (IN); Jing Sun, San Diego, CA (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 16/947,257

(22) Filed: Jul. 24, 2020

(65) Prior Publication Data

US 2021/0051696 A1 Feb. 18, 2021

(30) Foreign Application Priority Data

Aug. 16, 2019 (IN) .............................. 201941033102

(51) Int. Cl.
  *H04W 72/21*  (2023.01)
  *H04L 5/00*  (2006.01)
  *H04W 72/23*  (2023.01)

(52) U.S. Cl.
  CPC ........... *H04W 72/21* (2023.01); *H04L 5/0055* (2013.01); *H04W 72/23* (2023.01); *H04W 74/0808* (2013.01)

(58) Field of Classification Search
  CPC . H04W 72/21; H04W 72/23; H04W 74/0808; H04W 72/1268; H04W 16/14; H04L 5/0055; H04L 5/001; H04L 5/0048; H04L 5/0051; H04L 5/0053; H04L 1/1854
  See application file for complete search history.

(56) References Cited

U.S. PATENT DOCUMENTS

| | | | |
|---|---|---|---|
| 11,659,504 B2* | 5/2023 | Harada ................. | H04W 72/04 370/329 |
| 2016/0192396 A1* | 6/2016 | Ng ........................ | H04W 72/23 370/329 |
| 2018/0103458 A1* | 4/2018 | Tooher .................. | H04W 72/23 |

(Continued)

OTHER PUBLICATIONS

Motorola Mobility et al: "Feature lead summary for NR-U DL Signals and Channels", 3GPP Draft; R1-1903687_Featurelead_7.2.2.1.2, Mar. 3, 2019, XP051690938 (Year: 2019).*

(Continued)

*Primary Examiner* — Hardikkumar D Patel
(74) *Attorney, Agent, or Firm* — QUALCOMM Incorporated

(57) ABSTRACT

Wireless communications systems and methods related to communications in a network are provided. A user equipment (UE) may generate during a first time period, an uplink (UL) communication signal based on a scheduled grant or a configured UL grant. The UE may detect a downlink (DL) communication from a base station (BS) during a second time period after the first time period. The DL communication is devoid of the scheduled grant and the configured UL grant. The UE may transmit to the BS, the UL communication signal based on the scheduled grant or the configured UL grant in response to detecting the DL communication.

30 Claims, 10 Drawing Sheets

(56) References Cited

U.S. PATENT DOCUMENTS

2019/0044639 A1* 2/2019 Ouchi .................. H04W 72/23
2019/0074937 A1* 3/2019 Bhattad ................ H04L 1/1819
2021/0075556 A1* 3/2021 Karaki ................. H04B 7/0456

OTHER PUBLICATIONS

International Search Report and Written Opinion—PCT/US2020/043794—ISAEPO—dated Oct. 6, 2020.

Motorola Mobility., et al., "Feature Lead Summary for NR-U DL Signals and Channels," 3GPP Draft, 3GPP TSG RAN WG1 Meeting #96, R1-1903687, Feature Lead 7.2.2.1.2, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Mar. 3, 2019 (Mar. 3, 2019), XP051690938, 21 pages Retrieved from the Internet: URL: http://www.3gpp.org/ftp/tsg%5Fran/WG1%5FRL1/TSGR1%5F96/Docs/R1%2D1903687%2Ezip [retrieved on Mar. 3, 2019] p. 15. Proposal 2.

Spreadtrum Communications: "Discussion on HARQ Enhancements in NR-U", 3GPP Draft, 3GPP TSG RAN WG1 Ad-Hoc Meeting 1901, R1-1900706 Discussion on HARQ Enhancements in NR-U, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593553, pp. 1-5 Retrieved from the Internet: URL: http://www.3gpp.org/ftp/Meetings%5F3GPP%5FSYNC/RAN1/Docs/R1%2D1900706%2Ezip, [retrieved on Jan. 20, 2019], p. 3.

* cited by examiner

UPLINK (UL) TRANSMISSION CAPABILITY

CROSS REFERENCE TO RELATED APPLICATIONS & PRIORITY CLAIM

The present application claims priority to and the benefit of the Indian Provisional Patent Application No. 201941033102 filed Aug. 16, 2019, which is hereby incorporated by reference in its entirety as if fully set forth below and for all applicable purposes.

TECHNICAL FIELD

This application relates to wireless communication systems, and more particularly to UL transmission capabilities of a user equipment (UE).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to the channel to determine whether there are active transmissions in the channel. When the channel is idle, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes generating, by a user equipment (UE) during a first time period, an uplink (UL) communication signal based on a scheduled grant or a configured UL grant; detecting, by the UE, a downlink (DL) communication from a base station (BS) during a second time period after the first time period, wherein the DL communication is devoid of the scheduled grant and the configured UL grant; and transmitting, by the UE to the BS, the UL communication signal based on the scheduled grant or the configured UL grant in response to the detecting.

In an aspect of the disclosure, a method of wireless communication includes identifying, by a base station (BS), a reference scheduling delay; transmitting, by the BS to a user equipment (UE), a scheduling grant indicating a first schedule start time, wherein a delay between a transmission time of the scheduling grant and the first schedule start time is less than the reference scheduling delay; and receiving, by the BS from the UE, a communication signal based on the first schedule start time.

In an aspect of the disclosure, an apparatus of wireless communication includes a processor configured to: generate, during a first time period, an uplink (UL) communication signal based on a scheduled grant or a configured UL grant; and detect a downlink (DL) communication from a base station (BS) during a second time period after the first time period, wherein the DL communication is devoid of the scheduled grant and the configured UL grant; and a transceiver configured to: transmit to the BS, the UL communication signal based on the scheduled grant or the configured UL grant in response to the detecting.

In an aspect of the disclosure, an apparatus of wireless communication includes a processor configured to: identify a reference scheduling delay; and a transceiver configured to: transmit to a user equipment (UE), a scheduling grant indicating a first schedule start time, wherein a delay between a transmission time of the scheduling grant and the first schedule start time is less than the reference scheduling delay; and receive from the UE, a communication signal based on the first schedule start time.

In an additional aspect of the disclosure, a computer-readable medium having program code recorded thereon, the program code includes code for causing a user equipment (UE) during a first time period, to generate an uplink (UL) communication signal based on a scheduled grant or a configured UL grant; code for causing the UE to detect a downlink (DL) communication from a base station (BS) during a second time period after the first time period, wherein the DL communication is devoid of the scheduled grant and the configured UL grant; and code for causing the UE to transmit to the BS, the UL communication signal based on the scheduled grant or the configured UL grant in response to the detecting.

In an additional aspect of the disclosure, a computer-readable medium having program code recorded thereon, the program code includes code for causing a base station (BS) to identify a reference scheduling delay; code for causing the BS to transmit to a user equipment (UE), a scheduling grant indicating a first schedule start time, wherein a delay between a transmission time of the scheduling grant and the first schedule start time is less than the reference scheduling delay; and code for causing the BS to receive from the UE, a communication signal based on the first schedule start time.

In an additional aspect of the disclosure, an apparatus includes means for generating during a first time period, an uplink (UL) communication signal based on a scheduled grant or a configured UL grant; means for detecting a downlink (DL) communication from a base station (BS) during a second time period after the first time period, wherein the DL communication is devoid of the scheduled grant and the configured UL grant; and means for transmitting to the BS, the UL communication signal based on the scheduled grant or the configured UL grant in response to the detecting.

In an additional aspect of the disclosure, an apparatus includes means for identifying a reference scheduling delay; means for transmitting to a user equipment (UE), a scheduling grant indicating a first schedule start time, wherein a delay between a transmission time of the scheduling grant and the first schedule start time is less than the reference scheduling delay; and means for receiving from the UE, a communication signal based on the first schedule start time.

Other aspects and features of the present disclosure will become apparent to those of ordinary skill in the art, upon reviewing the following description of specific aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while some aspects may be discussed below as device, system, or method embodiments it should be understood that such aspects can be implemented in various devices, systems, and methods. Additionally, aspects of the present disclosure may be combined in different combinations, unless specifically stated.

DETAILED DESCRIPTION

Figure 1:
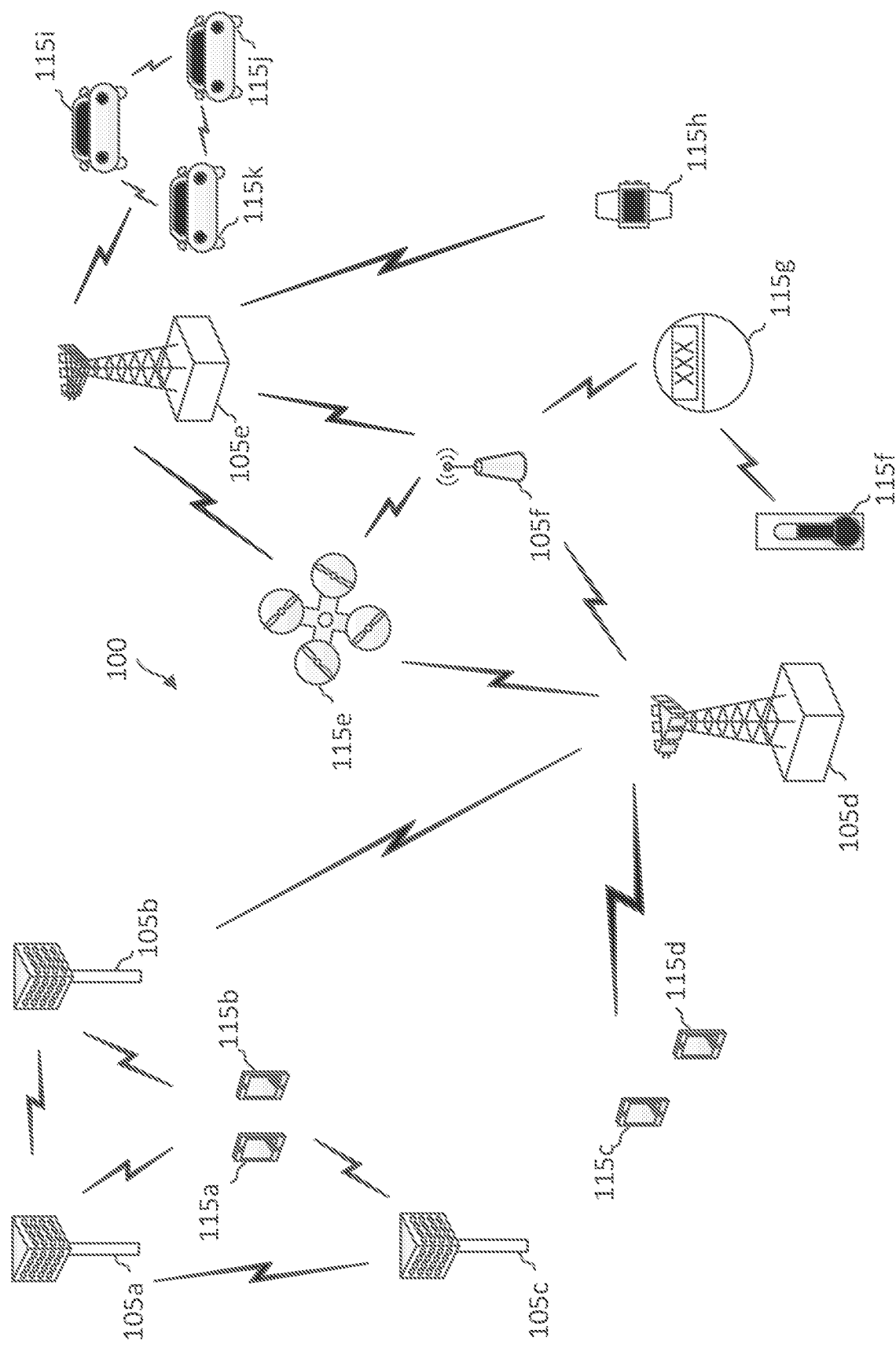
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier 1-DMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. In various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. In some aspects, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. In some aspects, a method may be implemented as part of a system, device, apparatus, and/or as instructions stored on a computer readable medium for execution on a processor or computer. Furthermore, an aspect may comprise at least one element of a claim.

A network may operate over shared frequency bands or unlicensed frequency bands, for example, at about 3.5 gigahertz (GHz), sub-6 GHz or higher frequencies in the mmWav band. Operations in unlicensed spectrum may include DL transmissions and/or UL transmissions. An UL transmission (e.g., scheduled UL transmission via a dynamic UL scheduling grant or autonomous UL transmission via a configured UL grant) in the licensed frequency band may occur under various circumstances. A grantless or grant-free uplink transmission is an unscheduled transmission, performed on the channel without an UL grant.

The present application describes mechanisms for reducing transmission timelines. In some aspects, a first timeline parameter (N1) may indicate a time period between a downlink (DL) data reception and a corresponding feedback for the DL data reception, and a second timeline parameter (N2) may indicate a time period between an uplink (UL) scheduling grant and a corresponding UL data transmission. The UE may prepare an UL transmission during a first time period, but unable to transmit the UL transmission before an end of a channel occupancy time (COT) acquired by a serving BS. In some cases, the UE may have insufficient time to decode the DL communication from the BS and prepare the UL transmission before the end of the COT. It may be unnecessary for the UE to prepare the UL packet again for transmission in a subsequent COT because the UL packet has already been pre-prepared. In some aspects, physical uplink control channel (PUCCH) and physical uplink shared channel (PUSCH) transmissions may be pre-prepared for cross-fixed frame period (FFP) grants and/or configured transmissions. A cross-FFP scheduling may refer to a scheduling grant being transmitted in a current FFP indicating a scheduled resource in a subsequent FFP. If the PUCCH and/or the PUSCH transmission is pre-prepared, the timeline for preparing the UL packet may be reduced. In some aspects, the N1 and/or N2 timelines may be reduced, resulting in earlier UL transmissions. Additionally, the BS may leverage knowledge of the UE's transmission capabilities and schedule the UE based on its transmission capabilities.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In some aspects, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an aspect of the disclosure, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots (e.g., about 10). Each slot may be further divided into mini-slots. In a FDD mode, simultaneous UL and DL transmissions may occur in different frequency bands. Each subframe may include an UL subframe in an UL frequency band and a DL subframe in a DL frequency band. In a TDD mode, UL and DL transmissions occur at different time periods using the same frequency band. A subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. Each DL or UL subframe may have pre-defined regions for transmissions of reference signals, control information, and data. Reference signals are predetermined signals that facilitate the communications between the BSs 105 and the UEs 115. In some aspects, a reference signal can have a particular pilot pattern or structure, where pilot tones may span across an operational BW or frequency band, each positioned at a pre-defined time and a pre-defined frequency. In some aspects, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

The network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

The UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), PUSCH, power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. In some aspects, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

A network may operate over a shared frequency band or an unlicensed frequency band, for example, at about 3.5 gigahertz (GHz), sub-6 GHz or higher frequencies in the mmWave band. The network 100 may partition a frequency band into multiple channels, each occupying about 20 megahertz (MHz). The BSs 105 and the UEs 115 may be operated by multiple network operating entities sharing resources in the shared or unlicensed frequency spectrum and may perform an LBT procedure (e.g., clear channel assessment (CCA)) prior to communicating to determine whether the channel is available. In some aspects, the BS 105 may employ an LBT procedure to reserve a COT in the shared medium for communications. A COT may be non-continuous in time and may refer to an amount of time a station can send frames when it has won contention for the wireless medium. In some aspects, a COT may also be referred to as a transmission opportunity (TXOP). Each COT may include a plurality of slots and one or more CCA periods.

The BS 105 may perform an LBT in the frequency band prior to transmitting in the frequency band and may transmit in one or more channels based on the LBT result. The BS 105 may perform an LBT based on energy detection and/or signal detection. The LBT may result in an LBT pass if the channel signal energy is below a threshold and/or no reservation signal is detected. Alternatively, the LBT may result in a failure if the channel signal energy is above a threshold and/or a reservation signal is detected. If the channel is available (performance of the LBT results in a LBT pass), the BS 105 may perform a DL transmission, receive an UL transmission from a UE 115, and/or schedule a UE 115 for data transmission and/or reception within a COT. If the channel is not available (performance of the LBT results in a LBT fail), the BS 105 may back off and perform the LBT procedure again at a later point in time. Additionally, the UE 115 may employ an LBT procedure (e.g., based on energy and/or signal detection) to ensure that the shared channel is clear before transmitting a signal in the shared channel. If the channel is available (performance of the LBT results in a LBT pass), the UE may perform an UL transmission. If the channel is not available (performance of the LBT results in a LBT fail), the UE may back off and perform the LBT procedure again at a later point in time.

Two broad types of LBT schemes may include Load Based Equipment (LBE) and Frame Based Equipment (FBE). In the LBE approach, the channel sensing is performed at any time instant and random back-off is used if the channel is found busy. In FBE, channel sensing is performed at fixed time instants (e.g., contention period or CCA), and if the channel is busy, the wireless communication device (e.g., BS or UE) backs off for a fixed time period and senses the channel again after this period. If the channel is free, the wireless communication device may use the next fixed frame period (FFP) for communicating DL and/or UL transmissions for up to a maximum COT. The FFP may also be referred to as a transmission period, which can be used for UL and/or DL transmissions.

Figure 2:
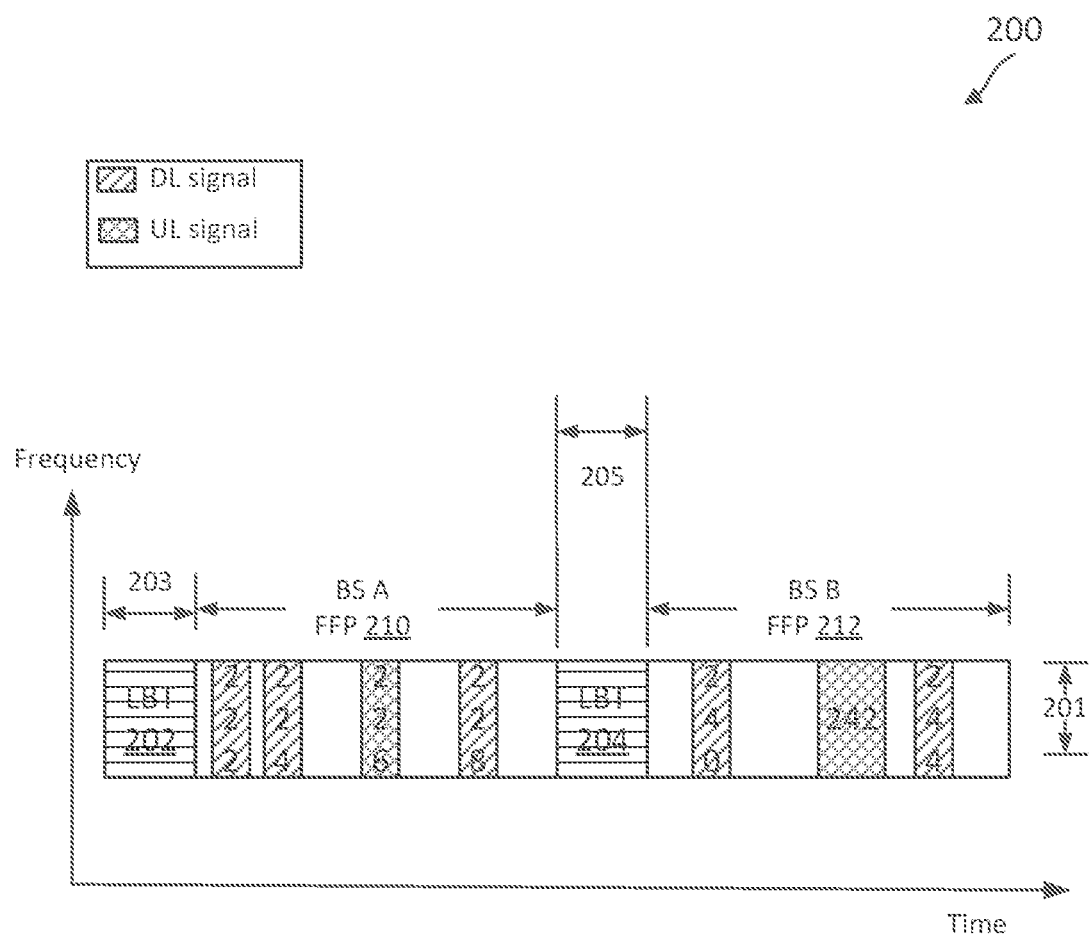
FIG. 2 illustrates an FBE spectrum sharing scheme according to one or more aspects of the present disclosure.

FIG. 2 illustrates an FBE spectrum sharing scheme 200 according to one or more aspects of the present disclosure. The x-axis represents time in some constant units. The y-axis represents frequency in some constant units. The scheme 200 may be employed by the BS 105 and the UE 115. The spectrum spans a frequency band 201 and is time-partitioned into a plurality of periods for spectrum sharing. Each period includes a contention period followed by a FFP. During a contention period, a plurality of BSs including a BS A and a BS B may contend for the shared medium and perform an LBT. Additionally, an FFP is fixed or configurable by the network 100. In some aspects, the FFP is configured from the range of 1 ms to 10 ms. The contention period and the FFP may have fixed durations and/or predetermined times. In some aspects, each contention period may include one or more OFDM symbols, and each FFP may include one or more subframes, slots, or TTIs. In some aspects, the FFP may be defined in units of slots (e.g., about 250 microseconds (μs) long). The FFP structure is pre-determined and known by all network operating entities sharing the shared spectrum. The network operating entities may be time-synchronized when operating in the shared spectrum.

Before a BS transmits a frame, the BS performs an LBT before the start of the frame. In FIG. 2, a BS A and a BS B may perform an LBT 202 in a frequency band 201 and contend for the shared medium during a contention period 203. Based on a successful LBT 202, the BS A reserves a COT in the frequency band 201 and communicates DL and UL signals during an FFP 210. During the FFP 210, the BS A transmits a DL signal 222 and a DL signal 224, receives an UL signal 226, and transmits a DL signal 228. Based on a failed LBT 202, the BS B skips the FFP 210 and contends for the medium again after the FFP 210, but before the start of the FFP 212.

The BS A and the BS B may perform an LBT 204 in the frequency band 201 and contend for the shared medium during a contention period 205. Based on a successful LBT 204, the BS B reserves a COT in the frequency band 201 and communicates DL and UL signals during an FFP 212. During the FFP 210, BS B transmits a DL signal 240, receives an UL signal 242, and transmits a DL signal 244. Based on a failed LBT 203, the BS A skips the FFP 212 and contends for the medium again after the FFP 212.

Figure 3:
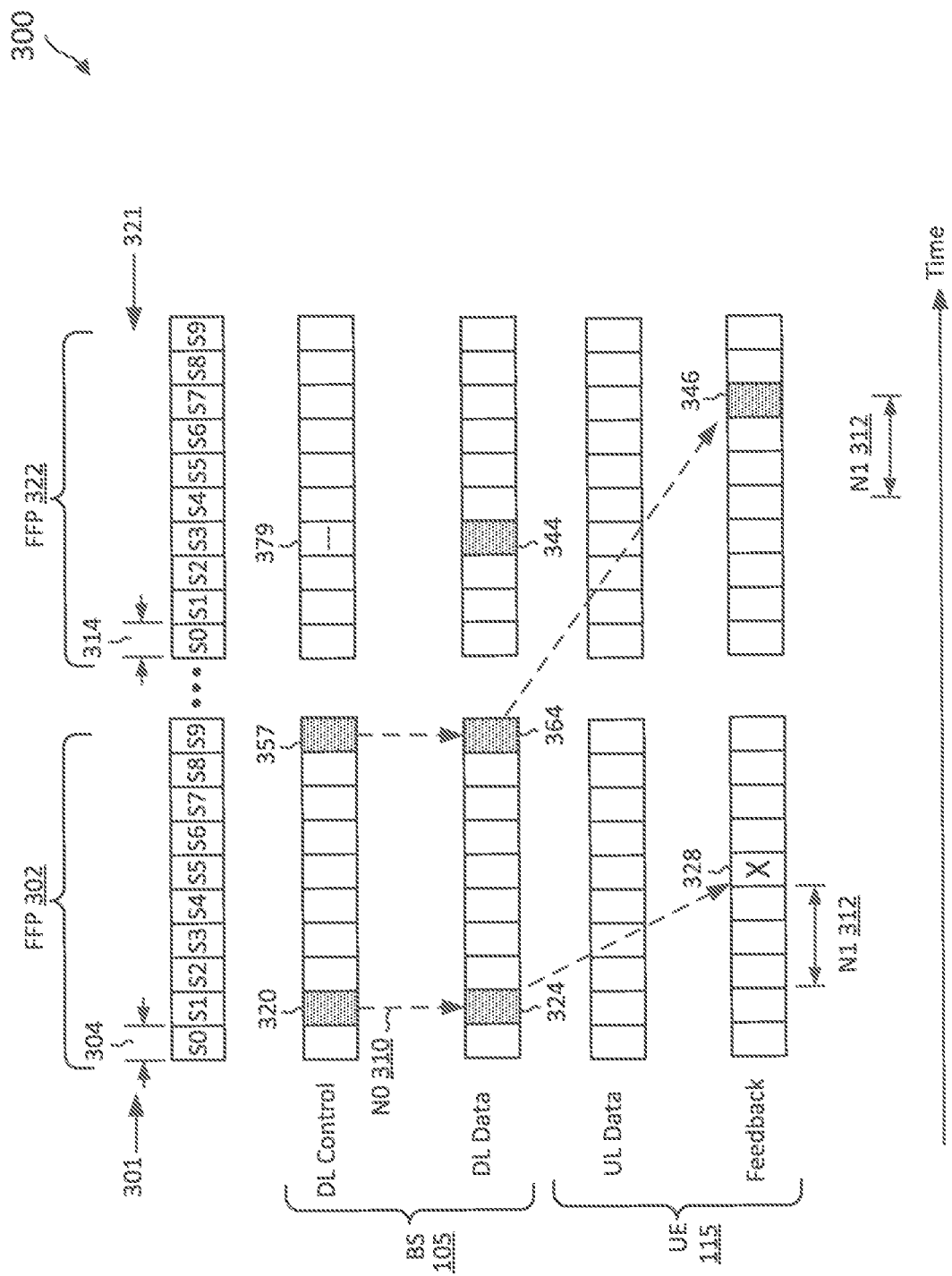
FIG. 3 illustrates a communication scheme for communicating an UL communication signal according to aspects of the present disclosure.

FIG. 3 illustrates a communication scheme 300 for communicating an UL communication signal according to aspects of the present disclosure. The communication scheme 300 may correspond to a communication scheme between a BS 105 and a UE 115 of the network 100. In FIG. 3, the x-axis represents time in some constant units. FIG. 3 shows a structure 301, 321 of an FFP 302, 322, respectively, in a shared channel Each of the FFP 302 and 322 are preceded by a contention period (e.g., the contention periods 203 and 205 in FIG. 2). The FFPs 302 and 322 are FFPs acquired by the BS using similar mechanisms as in the scheme 200 described above with respect to FIG. 2. The FFPs 302 and 322 may be spaced apart by one or more FFPs and corresponding contention periods, where the one or more FFPs are acquired by other BSs.

The FFP 302, 322 includes a plurality of slots 304, 314, respectively, in time. In FIG. 3, an FFP 302, 322 includes ten slots 304, 314 indexed from S0 to S9. In some aspects, each FFP may be configured as 10 ms, where each slot is 1 ms. The number of slots within an FFP may vary. The BS may acquire a COT for an FFP and transmit DL communications and/or receive UL communications during the COT. A BS may communicate with a UE in units of slots. The slots may also be referred to as TTIs. Each slot or TTI carries a medium access control (MAC) layer transport block. Each slot may include a number of symbols in time and a number of frequency tones in frequency. Each slot may include a DL control portion followed by at least one of a subsequent DL data portion, UL data portion, and/or a UL control portion. In the context of LTE, 5G, or NR, the DL control portion, the DL data portion, the UL data portion, and the UL control portion may be referred to as a PDCCH, a PDSCH, a PUSCH, and a PUCCH, respectively.

The BS and the UE may further communicate based on a parameter 310, denoted as N0, and a parameter 312, denoted as N1, each of which may also be referred to as a reference scheduling delay. The parameter 310 indicates a time period between a DL grant and a corresponding DL transmission. The parameter 312 indicates a time period between a DL data reception and corresponding feedback transmission for the DL data reception. The feedback may be referred to as an acknowledgement (ACK)/negative-acknowledgement (NACK), with an ACK indicating that reception of the DL data by the UE is successful and a NACK indicating that reception of the DL data by the UE is unsuccessful (e.g., including an error or failing an error correction). The parameters 310 and 312 may be pre-configured by the network and may be indicated in units of slots 304. In some instances, the parameters 310 and 312 may be indicated in downlink control information (DCI) carried in a PDCCH.

In some aspects, the parameter 310 may indicate a value 0 (e.g., N0=0), and the parameter 312 may indicate a value of 4 (e.g., N1=4). The parameter 312 may be in units of slots or symbols. The pattern-filled boxes of FIG. 3 may represent transmissions of DCI, DL data, UL data, an ACK, and/or an NACK in corresponding slots. While an entire slot is pattern-filled, in aspects, a transmission may occur only in a corresponding portion of the slot. Additionally, an "X" in a box represents a failed transmission (e.g., due to an LBT fail). Additionally, cross-FFP scheduling may refer to a scheduling grant being transmitted in a current FFP indicating a scheduled resource in a subsequent FFP.

The BSs contending for a COT (e.g., the FFP 302) in a shared channel may perform an LBT in the shared channel (e.g., during a corresponding contention period). If the LBT results in an LBT pass, the BS 105 may transmit DCI 320 in the slot 304 indexed S1 (e.g., in a DL control portion of the slot 304) during the FFP 302. The DCI 320 may indicate a DL grant for the UE 115 in the same slot 304 indexed S1 (e.g., N0=0) during the FFP 302. Thus, the BS 105 transmits a DL data signal 324 to the UE 115 in the slot 304 indexed S1 (e.g., in a DL data portion of the slot 304) during the FFP 302. The UE may receive the DCI 320 and receive the DL data signal 324 based on the DL grant.

After receiving the DL data signal 324, the UE 115 may report a reception status of the DL data signal 324 to the BS by transmitting an ACK/NACK signal 328 in the slot 304 indexed S5 during the FFP 302 (e.g., in a UL data portion or a UL control portion of the slot 304) based on the parameter 312 (e.g., N1=4). The slot 304 indexed S5 is a fourth slot from the slot 304 indexed S1. The ACK/NACK signal 328 refers to a feedback signal carrying an ACK or a NACK. The UE may transmit an ACK when the reception of the DL data signal 324 is successful. Alternatively, the UE may transmit a NACK when the reception of the DL data signal 324 is unsuccessful (e.g., including an error or failing an error correction).

Additionally, the DCI 320 may also indicate an UL grant for transmission of the ACK/NACK signal 328. The DCI 320 is related to the scheduled UL grant because the UE prepares the UL packet of the ACK/NACK signal 328 based on the DL data signal 324 and/or the scheduled UL grant indicated in the DCI 320. Further, the DCI 320 is related to the DL data signal 324 because the DCI 230 indicates the DL grant for the DL data signal 324. Further, the DCI 320 is related to the ACK/NACK signal 328 because the UE prepares to transmit the ACK/NACK signal 328 based on the scheduled UL grant indicated in the DCI 320 and further based on the scheduled DL grant for the DL data signal 324.

The ACK/NACK signal 328 may be associated with a hybrid automatic repeat request (HARQ) process. In a HARQ process, a transmitting node may transmit various coded versions of information data to a receiving node. In some aspects, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The N1 parameter 312 specifies a time delay to allow for PDCCH decoding, PDSCH decoding, and preparation and transmission of the ACK/NACK signal for the DL data signal. During the FFP 302, the UE receives the DCI 320 in a PDCCH. The UE performs PDCCH decoding on the DCI 320 to obtain a DL scheduling grant. The UE receives the DL data signal 324 (e.g., in a PDSCH) according to the DL scheduling grant. The DCI 320 may indicate resources for transmitting an ACK/NACK for the DL data signal 324. The UE prepares an UL packet of the ACK/NACK transmission for the DL data signal 324 and transmits the UL packet in the ACK/NACK resources. The N1 parameter 312 is defined to allow for the processing time from reception of the DL scheduling grant indicated in the DCI 320 to the UL packet transmission (e.g., encode and/or modulate a data packet). In some instances, the N1 parameter 312 may be referred to as a reference N1 parameter or a predetermined N1 parameter.

The UE may perform an LBT in the shared channel prior to transmission of the ACK/NACK signal 328 (e.g., the slot 304 indexed S5). The UE 115's ability to transmit the ACK/NACK signal 328 during the FFP 302 depends on whether the UE is able to gain access to the medium for transmission and/or reception of data. If the LBT results in an LBT pass, the UE 115 may transmit the ACK/NACK signal 328 during the FFP 302 (e.g., in the slot 304 indexed S5). Alternatively, if the LBT results in an LBT fail, the UE 115 may fail to transmit the ACK/NACK signal 328. Alternatively, the UE may have transmitted the UL packet of the ACK/NACK transmission, but the BS did not receive the ACK/NACK because of, for example, a poor channel condition. Accordingly, it is possible that the BS 105 does not receive the ACK/NACK signal 328 when expected (e.g., in the slot 304 indexed S5 during the FFP 302).

In FIG. 3, the slot 304 indexed S5 within the FFP 302 is marked with an "X," indicating that the BS did not receive the ACK/NACK signal 328 when expected. Thus, the BS may schedule a retransmission for the DL data signal 324. In some aspects, the BS transmits a DCI 357 in the slot 304 index S9 of the FFP 302 for the retransmission. The retransmission is shown as DL data signal 364 in the slot 304 index S9 of the FFP 302. Because the retransmission is at the end of the FFP 302 and the N1 parameter 312 is defined as 4, there is insufficient time for ACK/NACK transmission for the DL data signal 364 in the current FFP 302.

During the FFP 302, the UE prepares the UL packet of the ACK/NACK transmission (e.g., a ACK/NACK transmission 346) based on receiving the DL data signal 364 and the scheduled ACK/NACK resources or grant. In some aspects, the UE reuses its existing capability for UL transmission in an FFP. The UE may monitor for a DL transmission from the serving BS to determine when the BS acquires the next FFP 322. Upon detecting a PDSCH from the serving BS, the UE transmits the scheduled UL transmission (e.g., the pre-prepared UL packet carrying the ACK/NACK) in accordance with the parameter 312 (e.g., N1=4). In the communication scheme 300, the UE may transmit at a given time resource (including the ACK/NACK signal 346) if the UE successfully decodes PDSCH 344 "N1" symbols before the time resource in the same FFP 322. In other words, if the N1 parameter 312 is 4, the UE may transmit the scheduled UL ACK/NACK transmission 4 symbols after PDSCH 344 is detected in the same FFP 322 (e.g., transmit the UL ACK/NACK in slot 346 for DL data signal retransmission 364).

After the FFP 302, the UE may perform an LBT and acquire a COT within the FFP 322. During the FFP 322, the BS transmits a DL signal 344 in PDSCH to the UE 115 in the slot 314 indexed S3 (e.g., in a DL data portion of the slot 314). During the FFP 322, the UE may detect the DL signal 344. The DL signal 344 may have an associated DL grant 379. For example, the UE may receive the DL signal 344 based on the DL grant 379. As will be discussed further below, the DL signal 344 may or may not have an associated DL grant. In some aspects, the DL signal 344 may be a preamble signal or a broadcast signal, each of which may not have an associated DL grant.

The UE may determine, based on detection of the DL signal 344, that the BS has acquired the FFP 322. In some aspects, the UE may generate the UL communication signal 346 based on a scheduled UL grant indicated in the DCI 320, and the DL signal 344 is devoid of the scheduled UL grant. The DL signal 344 is devoid of the scheduled UL grant that was indicated in the DCI 320 and is also devoid of the scheduled UL grant that was indicated in the DCI 357. Additionally, the DL signal 324 and the DL signal 344 may have different data. The DL signal 344 may be unrelated to the scheduled UL grant indicated by the DCI 320 within the FFP 302, unrelated to the DL data signal 324, and further unrelated to the UL communication signal 346. Additionally, the DL signal 344 may be unrelated to the DCI 357 and the DL data signal 364. The UL communication signal 346 includes the pre-prepared UL packet of the ACK/NACK signal 328. Accordingly, based on detecting the DL data signal 344, the UE 115 may report a reception status of the DL data signal 364 to the BS by transmitting the UL communication signal 346 in the slot 314 indexed S7 during the FFP 322 (e.g., in a UL data portion or a UL control portion of the slot 314) based on the parameter 312 (e.g., N1=4). The slot 314 indexed S7 is a fourth slot from the slot 314 indexed S3.

Transmission of data may be an autonomous (i.e., unscheduled) transmission or a scheduled transmission. As discussed above, the UE attempts to transmit the ACK/NACK signal 328 via a scheduled UL grant (e.g., transmission in PDCCH via DCI 320). Additionally, the UE receives the DL data signal 324 via a scheduled grant (e.g., transmission in PDCCH via DCI indicated in the DCI 320). Although FIG. 3 discusses the transmission of the ACK/NACK signal 346 in relation to a scheduled UL ACK/NACK grant, it should be understood that this is not intended to be limiting. In some aspects, the UE may transmit any scheduled UL transmission (based on an UL schedule received in a previous FFP) or any configured UL transmission (based on a configured grant) that is N1 symbols after detecting PDSCH in the same FPP. A configured UL transmission is an unscheduled transmission, performed on the channel without an UL grant. A configured UL transmission may also be referred to as a grantless, grant-free, or autonomous transmission. In some aspects, the UE may transmit an UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. Rather than wait for an UL grant, the UE may desire to transmit an UL communication signal in a configured grant resource. The resources and other parameters used by the UE for a configured grant transmission may be provided by the BS in one or more of an RRC configuration or an activation DCI, without an explicit grant for each UE transmission.

To support more resource allocations in a network, transmissions may be scheduled based on a semi-persistent schedule (SPS). The BS may allocate configured grant resources in an unlicensed frequency band for UL or DL transmission. In some aspects, a configured grant resource is based on a SPS. After a LBT results in a LBT pass, the BS may perform LBT and acquire a FFP during which the BS transmits an SPS to a group of UEs. The BS may transmit to the UE, a configuration for a configured grant resource. In some aspects, the BS may transmit the SPS via a RRC configuration message. The RRC configuration message may configure the UE with semi-persistent resources for AUL transmissions. The SPS includes a plurality of resource allocations spaced apart in time. The plurality of resource allocations may be spaced apart in time in accordance with a time interval of, for example, about 40 ms. The plurality of resources may be allocated every 40 ms for each UE in the group of UEs. A resource may be shared with the group of UEs, and a UE may contend for the resource. The SPS may indicate scheduling information using relative timing (e.g., an offset time period relative to a current time period in which the scheduling information is communicated). The BS may receive an UL communication signal in a configured grant resource, using a resource allocation specified in the SPS.

In some aspects, the slot 304 indexed S5 within the FFP 302 is a configured grant resource. The UE may attempt to transmit the ACK/NACK signal 328 in the configured grant resource (e.g., in a DL data portion of the slot 304) and may accordingly prepare an UL packet of the ACK/NACK transmission based on receiving the DL data signal 324 and the UL scheduling grant indicated by the DCI 320 within the FFP 302. In some cases, the UE may be unable to transmit the prepared UL packet and accordingly may wait for a subsequent FFP to do so. The UE performs an LBT that results in a pass within the FFP 322. During the FFP 322, the UE may detect the DL signal 344. The UE may determine, based on detection of the DL signal 344, that the BS has acquired a COT within the FFP 322. In some aspects, the UE may generate the UL communication signal 346 based on a configured UL grant, and the DL signal 344 is devoid of the configured UL grant. The DL signal 344 may be unrelated to the configured UL grant that the UE attempted to use for transmitting the ACK/NACK signal 328, unrelated to the DL data signal 324, and further unrelated to the UL communication signal 346. Additionally, the DL signal 344 may be unrelated to the DCI 357 and the DL data signal 364. The UL communication signal 346 includes the pre-prepared UL packet of the ACK/NACK signal 328. Accordingly, based on detecting the DL data signal 344, the UE 115 may report a reception status of the DL data signal 364 to the BS by transmitting the UL communication signal 346 in the slot 314 indexed S7 during the FFP 322 (e.g., in a UL data portion or a UL control portion of the slot 314) based on the parameter 312 (e.g., N1=4).

The BS may receive the UL communication signal 346 in the PUCCH or the PUSCH in accordance with the parameter 312. The BS may receive the UL communication signal 346 4 symbols after transmitting the DL signal 344 in PDSCH to the UE 115. Referring to the FFP 302, the parameter 312 indicates a time period from reception of the DL scheduling grant indicated in the DCI 320 to the UL packet transmission when the UL data packet has not been pre-prepared. During the FFP 322, it is unnecessary for the UE to prepare the UL packet of the ACK/NACK signal 328 that is included in the UL communication signal 346 because the UL packet has already been pre-prepared (e.g., prepared from the previous FFP 302). During the FFP 322, the UE detects and decodes the DL signal 344 and transmits the UL communication signal 346, without preparing the UL packet of the ACK/NACK signal 328. In this case, the time consumed for preparing the UL packet approaches zero.

While FIG. 3 describes the cross-FFP transmission in the context of a ACK/NACK transmission for a DL retransmission, similar cross-FFP ACK/NACK scheduling may occur for an initial or new DL transmission (e.g., including new data).

Accordingly, for cross-FFP transmissions and configured grant transmissions, the parameter 312 may be reduced by using a pre-prepared UL packet for the PUCCH transmission. Additionally, the present disclosure provides techniques for reducing the decoding complexity, which may further reduce the time period between a DL data reception and a corresponding feedback transmission for the DL data reception (e.g., the parameter 312).

Figure 4:
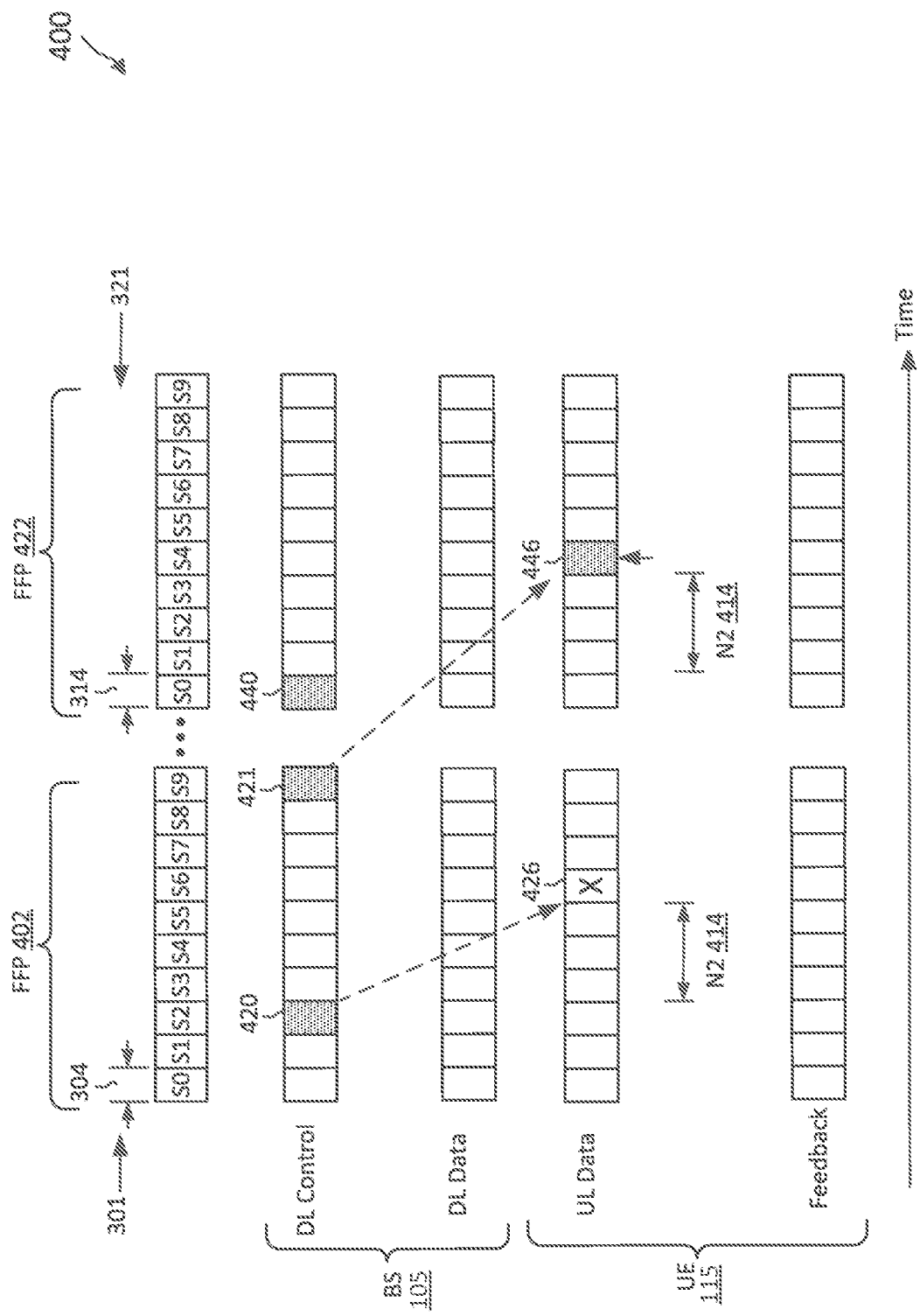
FIG. 4 illustrates a communication scheme for communicating an UL communication signal according to aspects of the present disclosure.

FIG. 4 illustrates a communication scheme 400 for communicating an UL communication signal according to aspects of the present disclosure. The communication scheme 400 may correspond to a communication scheme between a BS 105 and a UE 115 of the network 100. In FIG. 4, the x-axis represents time in some constant units. FIG. 4 shows the structure 301, 321 (discussed in relation to FIG. 3) of an FFP 402, 422, respectively, in a shared channel. The FFP 402, 422 includes a plurality of slots 304, 314, respectively, in time. In FIG. 4, an FFP 402, 422 includes ten slots 304, 314 indexed from S0 to S9.

The BS and the UE may further communicate based on a parameter 414, denoted as N2 and may also be referred to as a reference scheduling delay. The parameter 414 indicates a time period between reception of an UL scheduling grant and transmission of a corresponding UL data transmission. The parameter 414 may be pre-configured by the network and may be indicated in units of slots 304. In the context of LTE, the parameter 414 may be indicated in DCI carried in a PDCCH. The parameter 414 may indicate a value of 4 (e.g., N2=4). The pattern-filled boxes may represent transmissions of DCI, DL data, UL data, an ACK, and/or an NACK in corresponding slots. While an entire slot is pattern-filled, a transmission may occur only in a corresponding portion of the slot. Additionally, an "X" in a box represents a failed transmission (e.g., due to an LBT fail).

The BSs contending for a COT (e.g., the FFP 402) in a shared channel may perform an LBT in the shared channel (e.g., during a corresponding contention period). If the LBT results in an LBT pass, the BS 105 may transmit DCI 420 in the slot 304 indexed S2 (e.g., in a DL control portion of the slot 304) during the FFP 402. The DCI 420 may indicate an UL grant for the UE. The UE generates an UL data signal 426 based on the UL assignment and the parameter 414 (e.g., N2=4) for transmission of the UL data signal 426 in the slot 304 indexed S6 (e.g., in a UL data portion of the slot 304). The slot 304 indexed S6 is a fourth slot from the slot 304 indexed S2. As can be observed, a BS may indicate scheduling information using relative timing (e.g., an offset time period relative to a current time period in which the scheduling information is communicated). The DCI 420 is related to the scheduled UL grant because the UE prepares the UL packet based on the UL scheduling grant indicated by the DCI 420. Further, the DCI 420 is related to the UL data signal 426 because the DCI 420 indicates the UL grant for the UL data signal 426.

The parameter N2 414 specifies a time delay to allow for decoding PDCCH and preparing PUSCH. During the FFP 402, the UE receives the PDCCH carrying the DCI 420 for the PUSCH, decodes the DCI 420 indicating an UL scheduling grant for the PUSCH, and prepares an UL packet including UL data 426 (e.g., the PUSCH data) based on the UL scheduling grant. The parameter N2 414 is defined to allow for the processing time from reception of the UL scheduling grant indicated in the DCI 420 to the UL packet transmission (e.g., encode and/or modulate a data packet) when the UL data packet has not been pre-prepared. In some instances, the parameter N2 414 may be referred to as a reference N2 parameter or a predetermined N2 parameter.

The UE may perform an LBT in the shared channel prior to transmission of the UL data 426 (e.g., the slot 304 indexed S6). The UE 115's ability to transmit the UL data 426 during the FFP 402 depends on whether the UE is able to gain access to the medium for transmission and/or reception of data. If the LBT results in an LBT pass, the UE 115 may transmit the UL data 426 during the FFP 402 (e.g., in the slot 304 indexed S6). Alternatively, if the LBT results in an LBT fail, the UE 115 may fail to transmit the UL data 426.

In FIG. 4, the slot 304 indexed S6 within the FFP 402 is marked with an "X," indicating that the UE did not transmit the UL data 426 when expected (e.g., in the slot 304 indexed S6 during the FFP 402). In some aspects, the UE did not transmit the UL data 426 when expected because the UE was unable to transmit the UL packet during the current FFP 402. The BS may schedule a retransmission for the UL data signal 426. The BS may transmit a DCI 421 including a retransmission schedule in the slot 304 index S9 of the FFP 402. Because the DCI 421 is transmitted at the end of the FFP 402 and the parameter N2 414 is defined as 4, there is insufficient time for the transmission of the UL data 426 in the current FFP 402.

During the FFP 402, the UE prepares an UL packet for the transmission (shown as UL data 466) based on receiving the DCI 420 and/or DCI 421 indicating the UL scheduling grant. The UE may transmit the pre-prepared UL packet 466 in a subsequent FFP acquired by the serving BS. In some aspects, the UE reuses its existing capability for UL transmission in an FFP. The UE may monitor for a DL transmission from the serving BS to determine when the BS acquires the next FFP 422. Upon detecting a PDCCH from the serving BS, the UE transmits the scheduled UL transmission (e.g., the pre-prepared UL packet 466) in accordance with the parameter 414 (e.g., N2=4). In other words, if the parameter 414 is 4, the UE may transmit the scheduled UL transmission 4 symbols after PDCCH is detected in the same FPP.

After the FFP 402, the UE may perform an LBT and acquire a COT within the FFP 422. During the FFP 422, the BS transmits DCI 440 in PDCCH to the UE 115 in the slot 304 indexed S0 (e.g., in a DL data portion of the slot 304). During the FFP 422, the UE may detect the PDCCH. The UE may determine, based on detection of the DL signal (e.g., DCI 440), that the BS has acquired a COT within the FFP 322. In some aspects, the UE may generate the UL communication signal 446 based on a scheduled UL grant, and the DL signal 440 is devoid of the scheduled UL grant. The DL signal 440 is devoid of the scheduled grant indicated in the DCI 420 and is also devoid of the scheduled grant indicated in the DCI 421. The DCI 440 may be unrelated to the scheduled UL grant indicated by the DCI 420 within the FFP 402 and further unrelated to the UL communication signal 446. Additionally, the DL signal 344 may be unrelated to the DCI 421. The UL communication signal 446 includes the pre-prepared UL packet of the UL data 426. Accordingly, based on detecting the DCI 440, the UE 115 may transmit the UL data 426 to the BS by transmitting the UL communication signal 446 in the slot 314 indexed S4 during the FFP 422 (e.g., in a UL data portion or a UL control portion of the slot 314) based on the parameter 414 (e.g., N1=4). The slot 314 indexed S4 is a fourth slot from the slot 304 indexed S0.

Although FIG. 4 discusses the transmission of the PUSCH (e.g., UL data 426 via the communication signal 446) in relation to a scheduled UL grant, it should be understood that this is not intended to be limiting. In some aspects, the UE may transmit any scheduled UL transmission or any configured UL transmission that is N2 symbols after detecting PDCCH in the same FPP. In some aspects e, the slot 304 indexed S6 within the FFP 402 is a configured grant resource. The UE may attempt to transmit the UL data 426 in the configured grant resource (e.g., in a DL data portion of the slot 304) and may accordingly prepare an UL packet of the UL data 426 based on receiving the UL scheduling grant indicated by the DCI 420 or DCI 421 within the FFP 402. In some aspects, the UE is unable to transmit the prepared UL packet and waits for a subsequent FFP to do so. The UE performs an LBT that results in a pass within the FFP 422. During the FFP 422, the UE may detect the DCI 440. In some aspects, the UE may generate the UL communication signal 446 based on a configured UL grant, and the DL signal 440 is devoid of the configured UL grant. The DCI 440 may be unrelated to DCI 420, unrelated to the configured UL grant that the UE attempted to use for transmitting the UL data 426, and further unrelated to the UL communication signal 446. The UL communication signal 446 includes the pre-prepared UL packet of the UL data 426. Accordingly, based on detecting the DCI 440, the UE 115 may transmit the UL data 426 to the BS by transmitting the UL communication signal 446 in the slot 314 indexed S7 during the FFP 422 (e.g., in a UL data portion or a UL control portion of the slot 314) based on the parameter 412 (e.g., N1=4).

The BS may receive the UL communication signal 446 in the PUSCH in accordance with the parameter 414. In some aspects, the BS receives the UL communication signal 446 4 symbols after transmitting the DCI 440 in PDCCH to the UE 115. Referring to the FFP 402, the parameter 414 provides the processing time from reception of the UL scheduling grant indicated in the DCI 420 to the UL packet transmission when the UL data packet has not been pre-prepared. During the FFP 422, it is unnecessary for the UE to prepare the UL packet of the UL data 426 that is included in the UL communication signal 446 because the UL packet has already been pre-prepared (e.g., prepared from the previous FFP 402). During the FFP 422, the UE detects and decodes the DCI 440 and transmits an UL communication signal 446, without preparing the UL packet of the UL data 426. In some aspects, the time consumed for preparing the UL packet approaches zero.

While FIG. 4 describes the cross-FFP transmission in the context of a UL data transmission, similar cross-FFP UL data scheduling may occur for an initial or new UL transmission (e.g., including new data).

Accordingly, for cross-FFP transmissions and configured grant transmissions, the parameter 414 may be reduced by using a pre-prepared UL packet for the PUSCH transmission. Additionally, the present disclosure provides techniques for reducing the decoding complexity, which may further reduce the timeline for the parameter 414.

In some aspects, the N1 and N2 parameters may also be referred to as reference parameters or existing capabilities of the UE. If N1=4, the UE may be able to receive a DL scheduling grant and transmit an UL packet (including ACK/NACK signal 328) for DL data based on the DL scheduling grant in 4 symbols. If N2=4, the UE may be able to receive an UL scheduling grant and transmit an UL packet (including UL data) based on the UL scheduling grant in 4 symbols. As discussed above, the N1 and N2 timeline may be further reduced.

Figure 5:
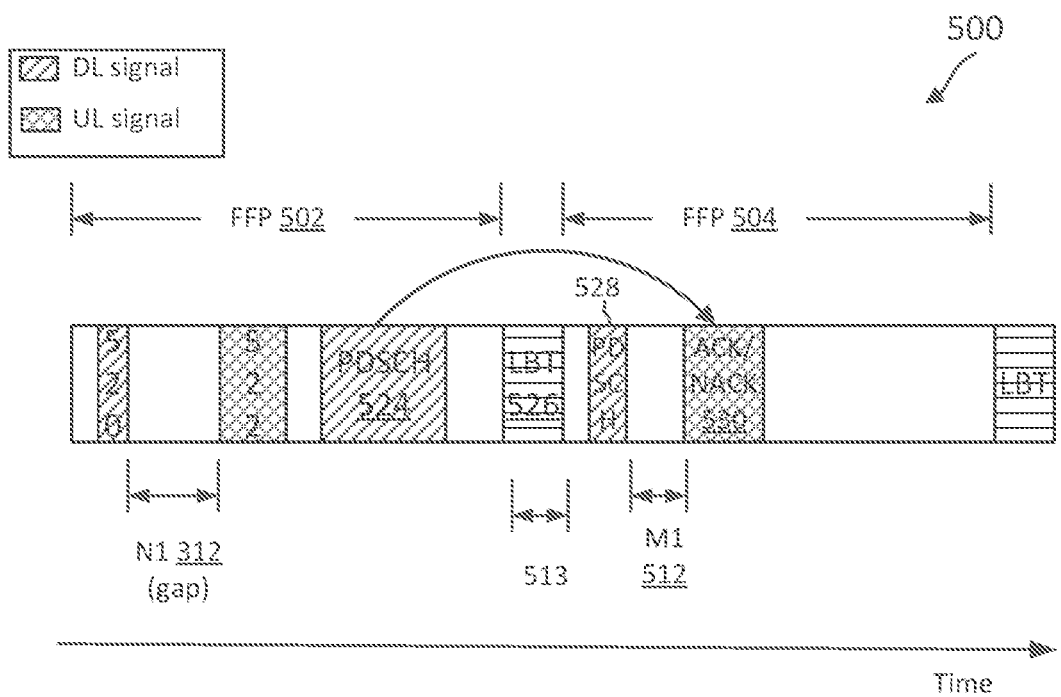
FIG. 5 illustrates a communication scheme for communicating an UL communication signal according to aspects of the present disclosure.

FIG. 5 illustrates a communication scheme 500 for communicating an UL communication signal according to aspects of the present disclosure. The communication scheme 500 may correspond to a communication scheme between a BS 105 and a UE 115 of the network 100. In FIG. 5, the x-axis represents time in some constant units. FIG. 5 shows an FFP 502 and an FFP 504 in a shared channel FFP 502, 504 may correspond to FFPs 302, 322 in FIG. 3 and/or to FFPs 402, 422 in FIG. 4.

Additionally, the parameter 312 (e.g., N1) was discussed in relation to FIG. 3 and may correspond to a parameter 512 (e.g., M1) in FIG. 5. The parameter 512 may be an added capability introduced for UL transmission in FFPs. In some aspects, the parameter 512 indicates a time period between a DL data reception and a corresponding feedback transmission for the DL data reception when the UL packet including the DL data reception is pre-prepared. If the UL packet is pre-prepared, then the PUCCH preparation time may be unnecessary, and M1 may be less than N1.

In FIG. 5, during an FFP 502, the BS transmits a DL signal 520 and receives an UL signal 522. The parameter 312 may indicate a gap between an end of the DL signal 520 and a start of the UL signal 522 within the FFP 502. Additionally, during the FFP 502, the BS transmits PDSCH 524. During the FFP 502, the UE may receive the DL signal 520, transmit the UL signal 522, and receive the PDSCH 524. Based on receiving the DL data in the PDSCH 524 and the scheduled ACK/NACK resources or grant, the UE may prepare, during the FFP 502, an UL packet of an ACK/NACK for the PDSCH 524, but may be unable to transmit the already prepared UL packet within the FFP 502.

The UE may monitor for a DL transmission from the serving BS to determine when the BS acquires the next FFP 504. During the FFP 504, the BS transmits PDSCH 528 to the UE. The UE may detect the PDSCH 528 and determine that the BS has acquired a COT in the FFP 504. The UE may perform an LBT within the FFP 504, and if the LBT results in an LBT pass, the UE may reserve a COT within the FFP 504. In some aspects, the UE may generate an UL communication signal based on a scheduled UL grant indicated in the PDSCH 524 and subsequently detect the PDSCH 528, which is devoid of the scheduled UL grant indicated in the PDSCH 524. The PDSCH 528 may be unrelated to the DL signal 520, the UL signal 522, and the PDSCH 524 communicated within the FFP 502. The UL communication signal includes the pre-prepared UL packet of the ACK/NACK signal 530 for the PDSCH 524. Accordingly, based on detecting the PDSCH 528, the UE 115 may transmit the ACK/NACK signal 530 by transmitting the UL communication signal to the BS.

The PDSCH 528 triggers the UE to transmit the ACK/NACK 530 within the FFP 504. During the FFP 502, the UE decodes and processes the PDSCH 524, and starts preparing the UL packet related to the PDSCH 524. Accordingly, when the UE acquires a COT within the FFP 504, it may be unnecessary for the UE to prepare the UL packet for transmission of the ACK/NACK for the PDSCH 524. The UE may transmit the pre-prepared UL packet of the ACK/NACK signal 530 (that was prepared during the FFP 502) to the BS during the FFP 504. The parameter 512 specifies a time delay to allow for PDSCH decoding (without the preparation time for the UL packet), and thus may be shorter than the parameter 312. The processing time from detection of the PDSCH 528 to the UL transmission of the pre-prepared UL packet may be based on the parameter 512.

In the communication scheme 500, the UE may transmit at a given time resource (including the ACK/NACK signal 530) if the UE successfully decodes PDSCH 528 "M1" symbols before the time resource in the same FFP 504. In other words, if the parameter 512 is 2, the UE may transmit the scheduled UL transmission 2 symbols after PDSCH is detected in the same FPP 504. Additionally, if the BS does not acquire a COT during the FFP 504, the BS may be unable to transmit the PDSCH 528. If the UE does not detect PDSCH 528 during the FFP 504 indicating that the serving BS did not acquire the FFP 504, the UE may not transmit the ACK/NACK signal 530 in the FFP 504 and may accordingly cancel transmission of the pre-prepared UL packet. In some aspects, the UE does not prepare transmission after detecting the PDSCH in an FFP subsequent to the FFP 504. It typically takes less time for the UE to cancel transmission of a packet than preparing the packet. As can be observed in the scheme 500, the UE pre-prepares the ACK/NACK transmission 530 during the FFP 502, and thus is not required to prepare the ACK/NACK transmission 530 after detecting the PDSCH 528. Accordingly, the parameter M1 512 can be less than the N1 parameter 312.

Further, it should be understood that the parameter 512 may be a function of the DL channel type (e.g., PDCCH, PDSCH, preamble, etc.), the UL channel type (e.g., PUCCH, PUSCH, etc.), resource allocation (TB size), and/or a demodulation reference signal (DMRS) pattern (front loaded versus if it has additional DMRS, etc.). The parameter 512 may be dependent on whether the UE determines that the BS had acquired the FFP 504 based on a received PDSCH or a received PDCCH since PDSCH decoding time may be different then PDCCH decoding time. Additionally, the PDSCH decoding time may be dependent on the PDSCH allocation size. The smaller the TB, the faster the TB may be decoded compared to a larger TB.

Further, the parameter 512 may be dependent on the DMRS pattern (e.g., the UE may determine that a serving BS had acquired an FFP 504 based on detecting a DMRS from the serving BS). The DMRS may include pilot symbols distributed across the frequency channel to enable the UE to perform channel estimation and demodulation for the PDSCH decoding. In some aspects, when the DMRS is a front-loaded DMRS located at the beginning of the allocation, the UE may detect the DMRS at an earlier time. When the DMRS is located at a later time in the allocation, the UE may detect the DMRS at a later time. Further, the PDSCH decoding time may also be dependent on the time location of the DMRS within the PDSCH.

In some aspects, the parameter 312 and/or the parameter 512 may be shortened further by reducing the DL detection and/or decoding time. In some aspects, for the pre-prepared UL packet of the ACK/NACK signal 530, which is feedback for the PDSCH 524, to be transmitted in the FFP 504, the UE may determine that the serving BS had acquired the FFP 504 based on detecting a DL signal from the serving BS. Accordingly, the parameter M1 512 can be reduced. In some aspects, for the current packet in the FFP 504, the PDSCH detection timeline can be shorter based on resource allocation/TB size, etc., as discussed in the present disclosure.

Figure 6:
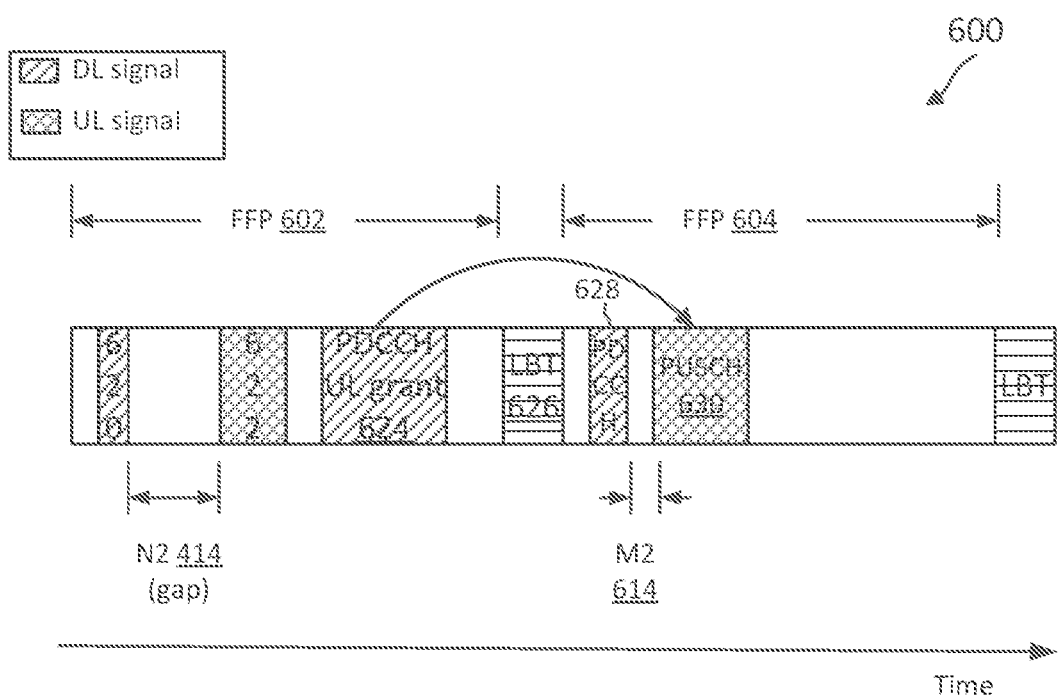
FIG. 6 illustrates a communication scheme for communicating an UL communication signal according to aspects of the present disclosure.

FIG. 6 illustrates a communication scheme 600 for communicating an UL communication signal according to aspects of the present disclosure. The communication scheme 600 may correspond to a communication scheme between a BS 105 and a UE 115 of the network 100. In FIG. 6, the x-axis represents time in some constant units. FIG. 6 shows an FFP 602 and an FFP 604 in a shared channel FFP 602, 604 may correspond to FFPs 302, 322 in FIG. 3 and/or to FFPs 402, 422 in FIG. 4.

The parameter 414 (e.g., N2) was discussed in relation to FIG. 4 and may correspond to a parameter 614 (e.g., M2) in FIG. 6. The parameter 614 may be an added capability introduced for UL transmission in FFPs. The parameter 614 may indicate a time period between reception of an UL scheduling grant and a corresponding UL data transmission when the UL packet including the UL data is pre-prepared. If the UL packet is pre-prepared, then the PUSCH preparation time may be unnecessary, and M2 may be less than N2.

In FIG. 6, during an FFP 602, the BS transmits a DL signal 620 and receives an UL signal 622. The parameter 414 may indicate a gap between an end of the DL signal 620 and a start of the UL signal 622 within the FFP 602. Additionally, during the FFP 602, the BS transmits PDCCH 624 indicating an UL grant. During the FFP 602, the UE may receive the DL signal 620, transmit the UL signal 622, and receive the PDCCH 624 indicating the UL grant. Based on receiving the UL grant indicated in the PDCCH 624, the UE may prepare an UL packet of an UL data for the PUSCH, but may be unable to transmit the already prepared UL packet within the FFP 602.

The FFP 604 is subsequent to and may be one or more FFPs after the FFP 602. The PDCCH 624 within the FFP 602 triggers a PUSCH 630 in the next FFP 604. During the FFP 604, the UE may detect PDCCH 628, which may be unrelated to the DL signal 620, the UL signal 622, and the PDCCH 624 communicated within the FFP 602. In some aspects, the UE may generate an UL communication signal based on a scheduled UL grant indicated in the PDCCH 624 and subsequently detect the PDSCH 628, which is devoid of the scheduled UL grant indicated in the PDCCH 624. The UE may transmit the PUSCH 630 within the FFP 604 based on detecting the PDCCH 628. The detection of the PDCCH 628 indicates that the serving BS had acquired the FFP 604. During the FFP 602, the UE decodes and processes the PDCCH 624, and starts preparing the UL packet related to the PDCCH 624. Accordingly, when the UE detects the PDCCH 628 and acquires a COT within the FFP 604, it may be unnecessary for the UE to prepare the UL packet for transmission of the UL data based on the UL grant indicated in the PDCCH 624. The UE may transmit the pre-prepared UL packet of the UL data (that was prepared during the FFP 602) to the BS during the FFP 604. The parameter 614 specifies a time delay to allow for PDCCH decoding (without the preparation time for the UL packet), and thus may be shorter than the parameter 414. The processing timeline from detection of the PDCCH 628 to the UL transmission of the pre-prepared UL packet may be based on the parameter 614.

In the communication scheme 600, the UE may transmit at a given time resource (including the UL data based on the PDCCH 624) if the UE successfully decodes PDCCH 628 "M2" symbols before the time resource in the same FFP 604. In other words, if the parameter 614 is 3, the UE may transmit the scheduled UL transmission 3 symbols after PDCCH 628 is detected in the same FPP 604. Additionally, if the BS does not acquire a COT for the FFP 604, the BS may be unable to transmit the PDCCH 628. If the UE does not detect PDCCH 628 during the FFP 604 indicating that the serving BS did not acquire the FFP 604, the UE may not transmit the UL data in the FFP 604 and may accordingly cancel transmission of the pre-prepared UL packet. It typically takes less time for the UE to cancel transmission of a packet than preparing the packet. As can be observed in the scheme 600, the UE pre-prepares the UL data transmission based on the PDCCH 624 during the FFP 502, and thus is not required to prepare the UL data transmission after detecting the PDCCH 628. Accordingly, the parameter M2 614 can be less than the parameter N2 414.

Further, it should be understood that the parameter 614 may be a function of the DL channel type (e.g., PDCCH, PDSCH, preamble, etc.), the UL channel type (e.g., PUCCH, PUSCH, etc.), resource allocation (TB size), and/or DMRS pattern (front loaded versus if it has additional DMRS, etc.). The parameter 614 may be dependent on whether the UE determines that the BS had acquired the FFP 604 based on a received PDSCH or a received PDCCH because PDSCH decoding time may be different then PDCCH decoding time. Additionally, the PDSCH decoding time may be dependent on the PDSCH allocation size. In some aspects, the smaller the TB, the faster the TB may be decoded compared to a larger TB. Further, the parameter 614 may be dependent on the DMRS pattern (e.g., the UE may determine that a serving BS had acquired a FFP 604 based on detecting a DMRS from the serving BS). The DMRS may include pilot symbols distributed across the frequency channel to enable the UE to perform channel estimation and demodulation for the PUSCH decoding. In some aspects, when the DMRS is located at a front-loaded DMRS at the beginning of the allocation, the UE may detect the DMRS at an earlier time. When the DMRS is located at a later time in the allocation, the UE may detect the DMRS at a later time. Further, the PDCCH decoding time may also be dependent on the time location of the DMRS within the PDCCH.

In some aspects, the parameter 414 and/or the parameter 614 may be shortened further by reducing the DL signal detection timeline and/or decoding time. For the UE to decode PDCCH (DCI), the UE determines, based on predefined rules or signaling messages, the range that possibly carries PDCCH. Within this range, the UE attempts to decode PDCCH/DCI using different possibilities and parameters based on a trial and error method. Accordingly, the PDCCH decoding timeline may be dependent on the number of blind decodes performed by the UE. To reduce the DL signal detection time, the DL signal detection may be based on a detection of a group-common (GC-PDCCH) or a preamble signal, or a PDCCH DMRS. The GC-PDCCH may require a short decoding time since the number of blind decoding for the GC-PDCCH may be low. The preamble may be any predetermined sequence (e.g., 1 symbol long) and may require a short detection time. The detection time for a PDCCH DMRS may also be lower than the PDCCH decoding time. Accordingly, it may be unnecessary for the UE to decode the entire PDCCH to determine that the serving BS had acquired the FFP. Thus, the UE may be able to detect the BS-acquired FFP faster. Accordingly, the parameter 614 may be reduced.

In some aspects, the parameter 414 and/or the parameter 614 may be shortened further by reducing the UL signal preparation time. In some aspects, the UL signal preparation time may be reduced based on a channel type, resource allocation, TB size, etc. In some aspects, it may be more time consuming for the UE to prepare an UL signal for a full bandwidth in PUSCH than a partial bandwidth in the PUSCH, which may be more time consuming for the UE to prepare an UL transmission for than an SRS or RACH occasion, etc.

The UE may adapt the parameters 512 and 614 based on any of the parameters and a combination of these parameters discussed in the present disclosure. Additionally, the parameters and settings based on which to adapt may be semi-statically determined or defined in a specification.

In some aspects, the BS may schedule the UE for UL transmissions before the timeline constraints for the UL transmission in FFP (e.g. the parameter 312 (N1), the parameter 414 (N2), the parameter 512 (M1), or the parameter 614 (M2)).

Figure 7:
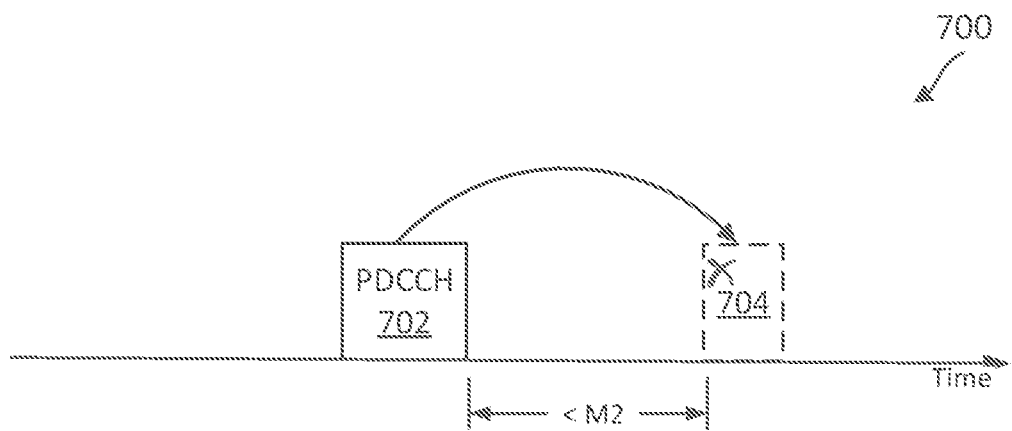
FIG. 7 illustrates a communication scheme for scheduling an UL transmission according to aspects of the present disclosure

FIG. 7 illustrates a communication scheme 700 for scheduling an UL transmission according to aspects of the present disclosure. The communication scheme 700 may correspond to a communication scheme between a BS 105 and a UE 115 of the network 100. In FIG. 7, the x-axis represents time in some constant units.

In FIG. 7, a BS may transmit PDCCH 702 to a UE. The PDCCH 702 may schedule the UE for transmission in a resource 704. To transmit in the resource 704, the UE is required to decode the PDCCH 702 and prepares the UL transmission in an amount of time that is within the parameter M2 614. If the UE is unable to prepare the UL transmission and transmit it using the resource 704 due to the time constraints specified by the parameter M2 614, the UE may determine to not transmit the UL packet. In some aspects, the UE may determine to skip the packet transmission. In response to the UE not transmitting the packet, the BS may cancel a previously scheduled UL transmission for the UE by providing the UE with an UL scheduling grant with an amount of time that is less than the parameter M2 614 to UL transmissions.

Figure 8:
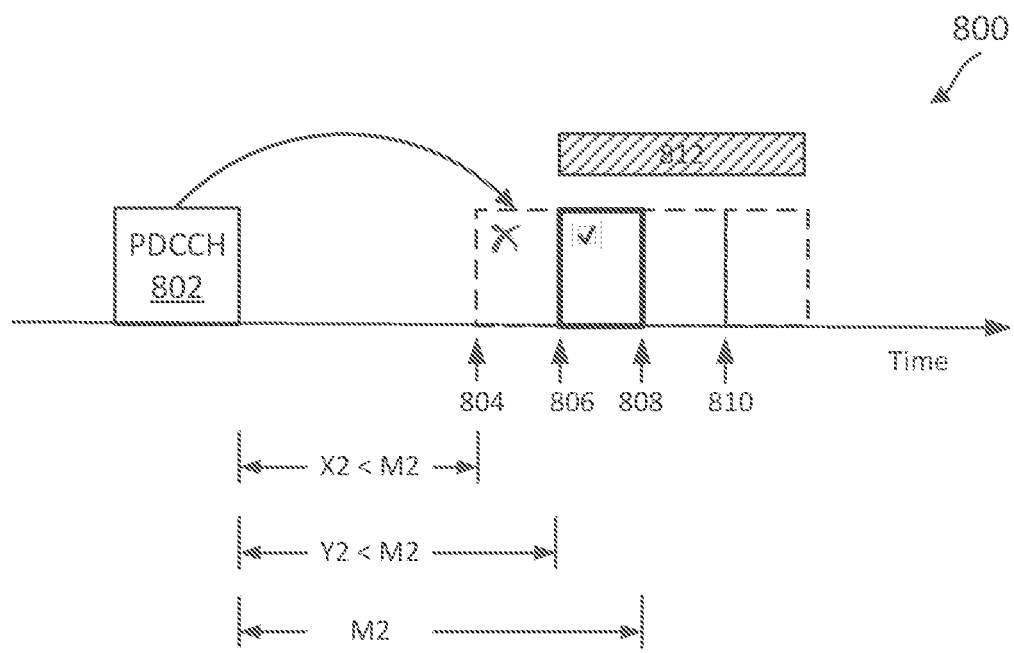
FIG. 8 illustrates a communication scheme for scheduling an UL transmission according to aspects of the present disclosure.

FIG. 8 illustrates a communication scheme 800 for scheduling an UL transmission according to aspects of the present disclosure. The communication scheme 800 may correspond to a communication scheme between a BS 105 and a UE 115 of the network 100. In FIG. 8, the x-axis represents time in some constant units.

In FIG. 8, the BS may transmit PDCCH 802 to a UE. In a first scheduling pattern, the BS may schedule the UE for transmission at a plurality of start points 804, 806, 808, and 810 in one or more slots within an FFP. The PDCCH 802 may indicate the plurality of start points 804, 806, 808, and 810. The scheduled UL transmissions may be based on a common PDCCH 802 and/or a common PDSCH. The UE may receive the PDCCH 802 and determine at which start points of the plurality of start points the UE may meet the processing time constraint(s) indicated by the PDCCH 802. The UE may determine whether it can transmit an UL transmission at the start point 804, which provides the UE with less than "M2" units (e g mini-slots) to transmit the UL communication. If the UE determines that it is unable to meet this processing time constraint, the UE may skip the transmission (see also FIG. 7). The UE may continue to skip one or more of the beginning start points of the plurality of start points 804, 806, 808, and 810 for its transmission until the UE determines that it can meet the processing time constraint of a start point. In some aspects, the UE may determine that it can transmit an UL transmission at the starting point 806, which provides with UE with more than "X2" units but less than "M2" units to transmit the UL communication. The UE may transmit an UL communication 812 at the start point 806, without taking the remaining start points (e.g., start points 808 and 810) into consideration.

In some aspects, the UE is able to transmit at an earlier time (e.g. starting point 806) than starting points 808 and 810. Accordingly, the UE may respond to the PDCCH 802 faster and transmit UL communication at an earlier time in accordance with its capabilities. The BS may track the UE's transmissions and maintain a list of the UE's transmission capabilities. In some aspects, the BS may be aware that the UE is able to transmit UL communications within "Y2" symbols or slots of receiving PDCCH and schedule the UE accordingly in the future.

In a second scheduling pattern, the UE determines whether it has detected a DL signal in a channel from a serving BS. In response to a determination that it has a detected the DL signal in the channel and the DL signal is above a threshold, the UE may determine to transmit the packet in the channel to the BS. The UE implementations may be faster than the N1, N2 time constraints so that the UE can benefit from using more resources if its timelines are faster (e.g., a faster response time to a PDCCH 802). Additionally, the benefits may be opportunistic. In some aspects, if the PDSCH allocation is small, the UE can decode faster than the worst-case timeline for PDSCH. Similarly, the PDCCH may be in a candidate position from which the UE had previously tried to detect. The BS may track the UE's capability. The BS may learn about the UE's capabilities by scheduling the UL transmissions earlier and determining whether the UE is able to transmit based on the schedule. The BS may schedule the UL transmissions aggressively (e.g., before the N1 and/or N2 timeline constraint) to determine the UE's capabilities.

Additionally, in some aspects, if a network has only UL traffic and the UE always skips the UL packet transmission that is scheduled by the BS, in each FFP, some initial slots (within the N1, N2 timeline, etc.) would not be usable for UL traffic. If the UE transmits an UL packet in the channel to the BS in response to detecting the DL signal, UE may be able to make at least one of the initial slots.

In some aspects, the UE selects the first scheduling pattern and/or the second scheduling pattern based on one or more of RRC configurations indicating the first scheduling pattern versus the second scheduling pattern. In some aspects, a DCI provides the UE with an indication on whether to apply the first scheduling pattern or the second scheduling pattern. In some aspects, the UE selects the first scheduling pattern and/or the second scheduling pattern based on an UL channel type (PUCCH vs PUSCH vs PRACH etc.). In some aspects, the UE selects the first scheduling pattern and/or the second scheduling pattern based on whether the channel is RRC configured or scheduled through DCI. Any of the above aspects or examples may be combined.

Although some aspects of the description are discussed in the context of FFP in FBE systems, this is not intended to be limiting. Aspects of the description may apply to LBE systems. Additionally, aspects of the description may helpful if the BS schedules an UL transmission on back-to-back slots for the UE, and the first slot scheduled is earlier than the regular N2 timeline. The UE may use that first slot if its implementation timelines allow the UE to do so for that scenario. Further, some aspects of the description may use an opportunistic approach based on the UE being able to meet the earlier timeline (M1 or M2) (e.g., may depend on the actual allocation, which UL channel is scheduled, etc.). Using an opportunistic approach may reduce the gap from UL grant to UL transmission by UE, hence reducing chances of other nodes obtaining the medium. The BS may allow opportunistic transmission by UE on resources earlier than the guaranteed UE's capability.

Similarly, it may be useful for licensed NR operation to opportunistically reduce the latency. The BS may request the UE to perform an UL transmission in slot N and N+1 based on an UL grant, where N is before the UE capability so it is not guaranteed to be useable. The N+1 timeline can be met by UE. The UE can transmit on slot N opportunistically but if that fails (or additionally), it can transmit on N+1 as backup. The BS may use the M1 and/or M2 parameters for scheduling UL transmission based on the UL channel, associated DL channel, exact resource allocation (number of resources blocks, number of resource elements, number of symbols, etc.), other parameters (e.g., TB size, rank, DMRS pattern for associated DL and/or UL transmission, PDCCH parameters (e.g., as aggregate level, offset, search space etc.) Accordingly, the BS may allow opportunistic transmission by the UE on resources earlier than the UE's guaranteed capability.

Figure 9:
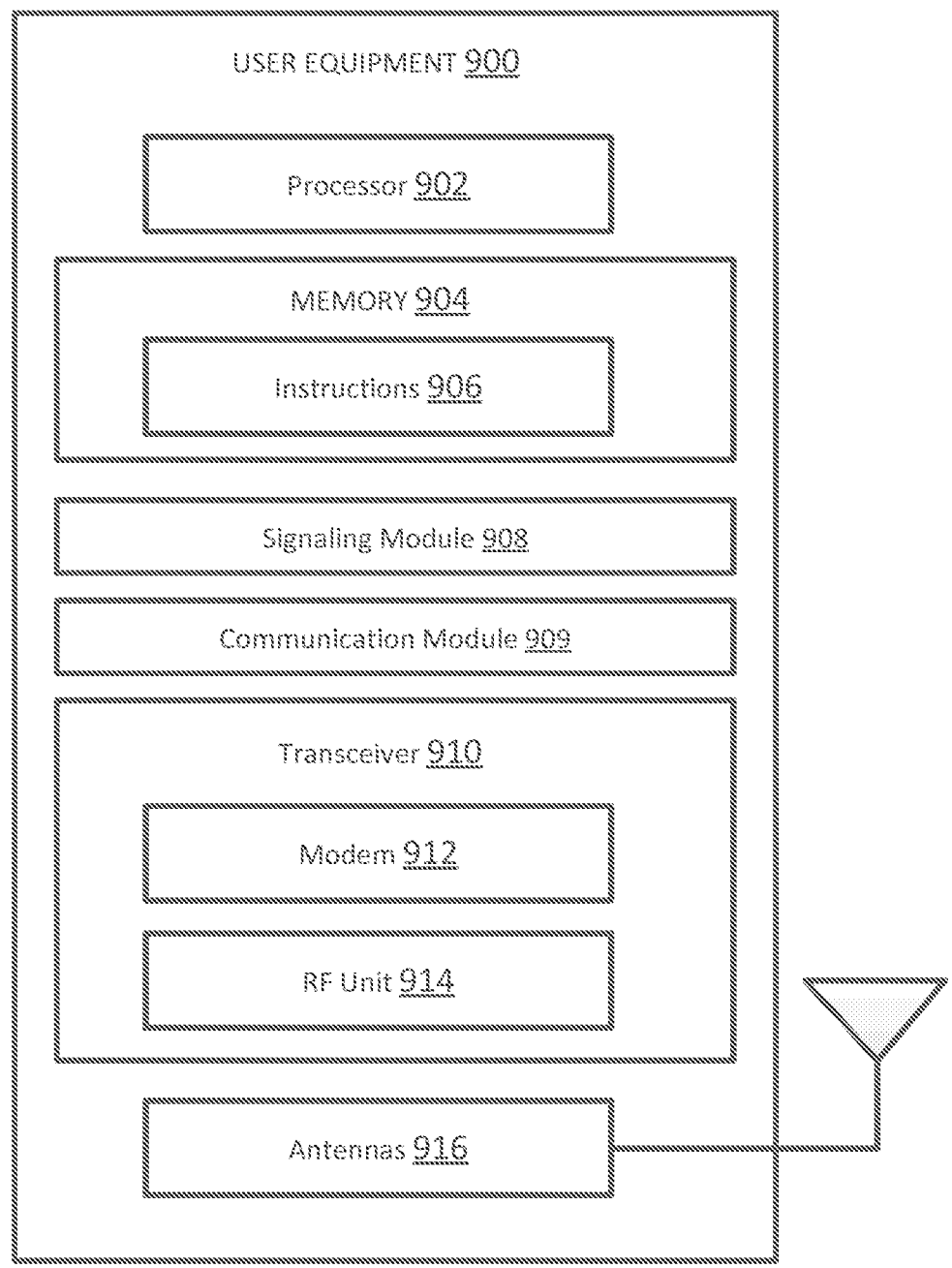
FIG. 9 is a block diagram of a user equipment (UE) according to some aspects of the present disclosure.

FIG. 9 is a block diagram of a UE 900 according to some aspects of the present disclosure. The UE 900 may be a UE 115 as discussed above. As shown, the UE 900 may include a processor 902, a memory 904, a signaling module 908, a communication module 909, a transceiver 910 including a modem subsystem 912 and an RF unit 914, and one or more antennas 916. These elements may be in direct or indirect communication with each other, for example, via one or more buses.

The processor 902 may have various features as a specific-type processor. In some aspects, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure. Instructions 906 may also be referred to as code. The terms "instructions" and "code" should be interpreted broadly to include any type of computer-readable statement(s). In some aspects, the terms "instructions" and "code" may refer to one or more programs, routines, subroutines, functions, procedures, etc. "Instructions" and "code" may include a single computer-readable statement or many computer-readable statements.

The signaling module 908 and/or the communication module 909 may be implemented via hardware, software, or combinations thereof. The signaling module 908 and/or the communication module 909 may be implemented as a processor, circuit, and/or instructions 906 stored in the memory 904 and executed by the processor 902. The signaling ling module 908 and/or the communication module 909 may be used for various aspects of the present disclosure.

In some aspects, the signaling module 908 may be configured to generate during a first time period, an UL communication signal based on a scheduled grant or a configured UL grant. The communication module 909 may be configured to detect a DL communication from a BS during a second time period after the first time period, wherein the DL communication is devoid of the scheduled grant of the UL communication signal and/or devoid of the configured UL grant. The communication module 909 may be further configured to transmit the UL communication signal based on the scheduled grant or the configured UL grant in response to the detecting.

As shown, the transceiver 910 may include the modem subsystem 912 and the RF unit 914. The transceiver 910 can be configured to communicate bi-directionally with other devices, such as the BSs 95. The modem subsystem 912 may be configured to modulate and/or encode the data from the memory 904, the signaling module 908 and/or the communication module 909 according to a Modulation Coding Scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 or 900 to enable the UE 115 or 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

Figure 10:
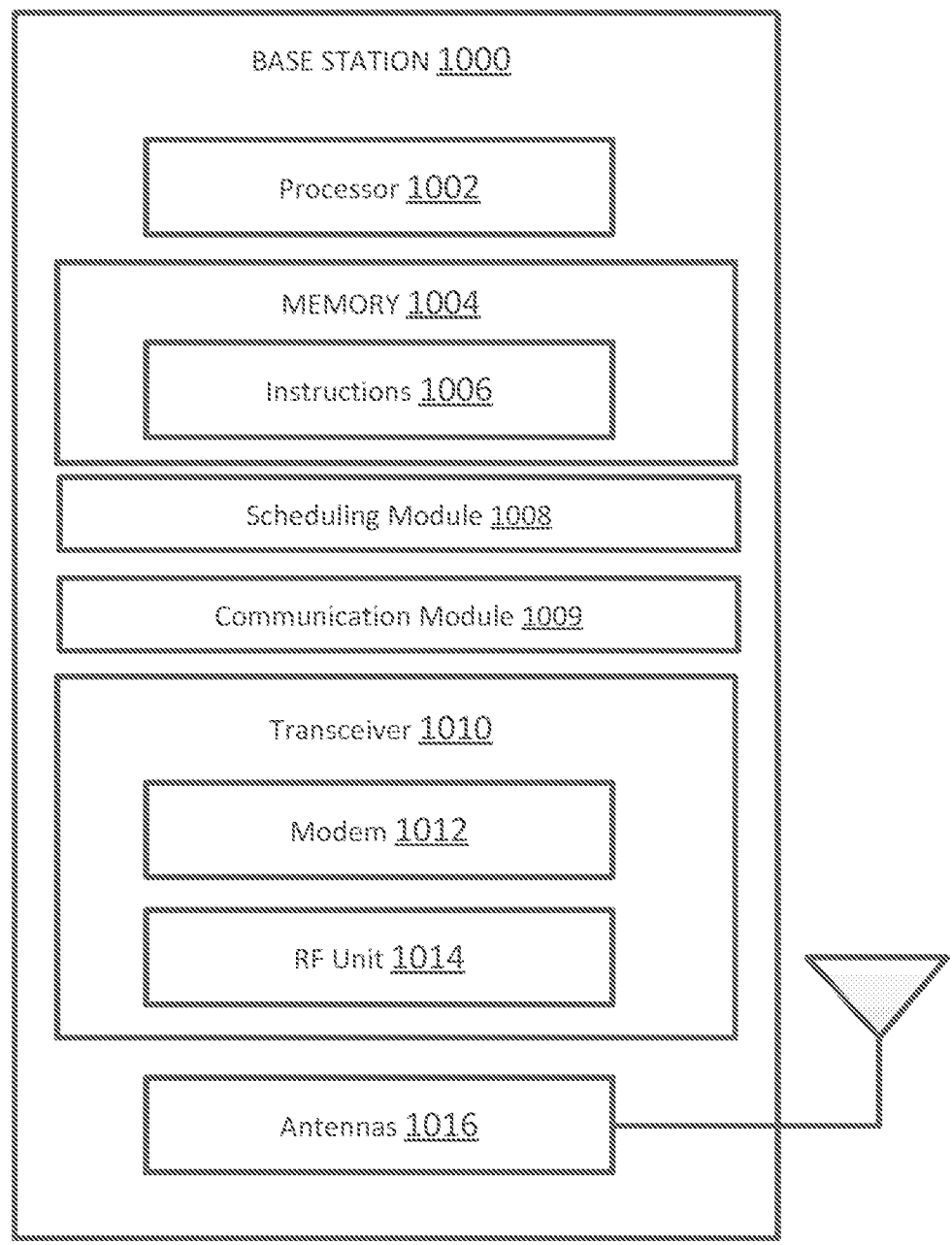
FIG. 10 is a block diagram of a base station (BS) according to some aspects of the present disclosure.

FIG. 10 is a block diagram of a BS 1000 according to some aspects of the present disclosure. The BS 1000 may be a BS 105 as discussed above. As shown, the BS 1000 may include a processor 1002, a memory 1004, a scheduling module 1008, a communication module 1009, a transceiver 1010 including a modem subsystem 1012 and a radio frequency (RF) unit 1014, and one or more antennas 1016.

These elements may be in direct or indirect communication with each other, for example via one or more buses.

The processor 1002 may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, solid state memory device, hard disk drives, memristor-based arrays, other forms of volatile and non-volatile memory, or a combination of different types of memory. In some aspects, the memory 1004 includes a non-transitory computer-readable medium. The memory 1004 may store instructions 1006. The instructions 1006 may include instructions that, when executed by the processor 1002, cause the processor 1002 to perform operations described herein with reference to the BSs 105 in connection with aspects of the present disclosure. Instructions 1006 may also be referred to as code, which may be interpreted broadly to include any type of computer-readable statement(s) as discussed above with respect to FIG. 9.

The scheduling module 1008 and/or the communication module 1009 may be implemented via hardware, software, or combinations thereof. In some aspects, the scheduling module 1008 and/or communication module 1009 may be implemented as a processor, circuit, and/or instructions 1006 stored in the memory 1004 and executed by the processor 1002. The scheduling module 1008 and/or the communication module 1009 may be used for various aspects of the present disclosure.

In some aspects, the scheduling module 1008 may be configured to identify a reference scheduling delay and determine PDCCH, PDSCH, PUCCH, and/or PUSCH transmissions schedules based on the reference scheduling delay. The communication module 1009 may be configured to transmit to a UE, a scheduling grant indicating a schedule start time. A delay between a transmission time of the scheduling grant and the schedule start time may be less than the reference scheduling delay. The communication module 1009 may be further configured to receive from the UE, a communication signal based on the schedule start time.

As shown, the transceiver 1010 may include the modem subsystem 1012 and the RF unit 1014. The transceiver 1010 can be configured to communicate bi-directionally with other devices, such as the UEs 115, 900, a BS, and/or a core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or BS 105. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the BS 105 or 1000 to enable the BS 105 or 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

Figure 11:
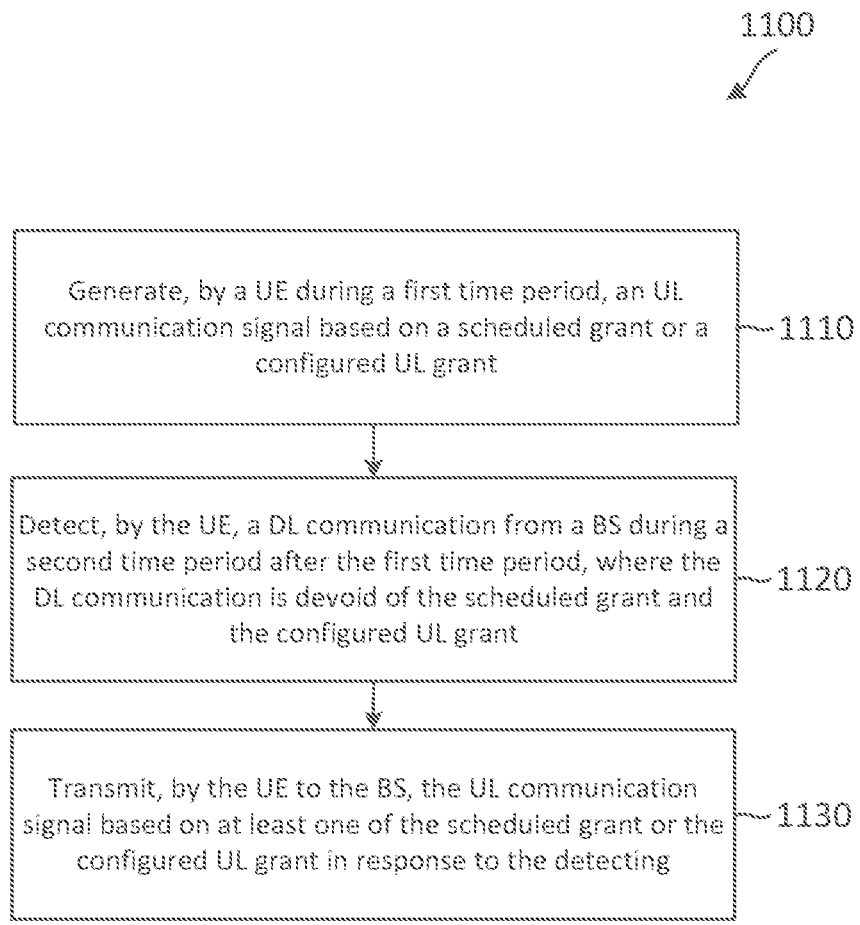
FIG. 11 is a flow diagram of a communication method according to some aspects of the present disclosure.

FIG. 11 is a flow diagram of a communication method 1100 according to aspects of the present disclosure. Steps of the method 1100 can be executed by a computing device (e.g., a processor, processing circuit, and/or other suitable component) of a wireless communication device, such as the UEs 115 and 900. In some aspects, the UE 115 and the UE 900 may utilize one or more components, such as the processor 1102, the memory 1104, the scheduling module 1108, the communication module 1109, the transceiver 1110, and/or the antennas 1116 to execute the steps of method 1100. The method 1100 may employ similar mechanisms as in the FBE spectrum sharing scheme 200 in FIG. 2, the communication scheme 300 in FIG. 3, the communication scheme 400 in FIG. 4, the communication scheme 500 in FIG. 5, and/or the communication scheme 600 in FIG. 6. As illustrated, the method 1100 includes a number of enumerated steps, but aspects of the method 1100 may include additional steps before, after, and in between the enumerated steps. In some aspects, one or more of the enumerated steps may be omitted or performed in a different order.

At step 1110, the method 1100 includes generating, by a UE during a first time period, an UL communication signal based on a scheduled grant or a configured UL grant. At step 1120, the method 1100 includes detecting, by the UE, a DL communication from a BS during a second time period after the first time period, where the DL communication is devoid of the scheduled grant and the configured UL grant. At step 1130, the method 1100 includes transmitting, by the UE to the BS, the UL communication signal based on the scheduled grant or the configured UL grant in response to the detecting.

Figure 12:
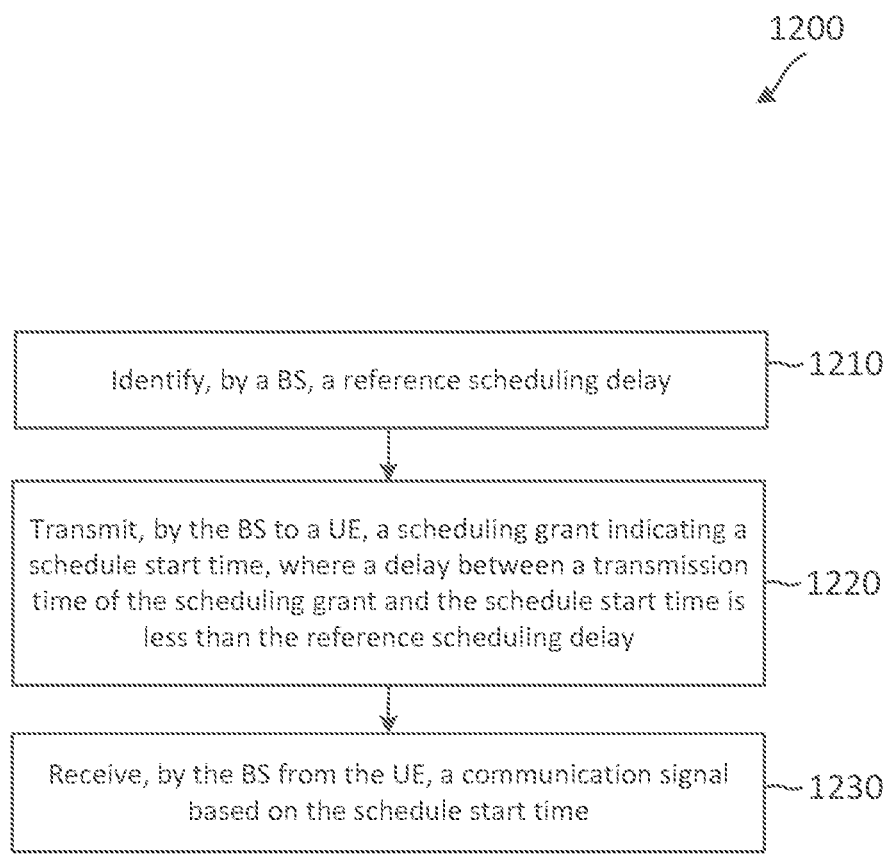
FIG. 12 is a flow diagram of a communication method according to aspects of the present disclosure.

FIG. 12 is a flow diagram of a communication method 1200 according to aspects of the present disclosure. Steps of the method 1200 can be executed by a computing device (e.g., a processor, processing circuit, and/or other suitable component) of a wireless communication device, such as the BSs 105 and 1000. In some aspects, BS 105, 1000 may utilize one or more components, such as the processor 1002, the memory 1004, the scheduling module 1008, the communication module 1009, the transceiver 1010, and/or the antennas 1016 to execute the steps of method 1200. The method 1200 may employ similar mechanisms as in the FBE spectrum sharing scheme 200 in FIG. 2, the communication scheme 300 in FIG. 3, the communication scheme 400 in FIG. 4, the communication scheme 500 in FIG. 5, and/or the communication scheme 600 in FIG. 6. As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1210, the method 1200 includes identifying, by a BS, a reference scheduling delay. At step 1220, the method 1200 includes transmitting, by the BS to a UE, a scheduling grant indicating a schedule start time, where a delay between a transmission time of the scheduling grant and the schedule start time is less than the reference scheduling delay. At step 1230, the method 1200 includes receiving, by the BS from the UE, a communication signal based on the schedule start time.

Information and signals may be represented using any of a variety of different technologies and techniques. In some aspects, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. Due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (e.g., a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
generating, by a user equipment (UE) during a first time period, an uplink (UL) communication signal based on a scheduled grant or a configured UL grant;
detecting, by the UE, a downlink (DL) communication from a base station (BS) during a second time period after the first time period, wherein the DL communication is devoid of the scheduled grant and the configured UL grant; and
transmitting, by the UE to the BS, the UL communication signal based on the scheduled grant or the configured UL grant in response to the detecting.

2. The method of claim 1, comprising:
receiving, by the UE during the first time period, DL control information (DCI) indicating the scheduled grant, wherein the scheduled grant is a DL grant; and
receiving, by the UE during the first time period, DL data based on the scheduled grant, wherein the generating includes preparing, by the UE during the first time period, an UL packet of an ACK/NACK feedback for the DL data.

3. The method of claim 1, comprising:
performing, by the UE during the first time period, a listen-before-talk (LBT) prior to transmission of the UL communication signal;
determining, by the UE during the first time period, to not transmit the UL communication signal based on a result of the LBT;
monitoring, by the UE, for the DL communication after a determination to not transmit the UL communication signal; and
determining, based on receiving the DL communication, that the BS has acquired a channel within the second time period.

4. The method of claim 1, wherein a first parameter indicates a time period between reception of DL data based on the scheduling grant and corresponding transmission of an ACK/NACK feedback for DL data.

5. The method of claim 4, wherein transmitting the UL communication signal includes transmitting during the second time period the UL communication signal in accordance with the first parameter.

6. The method of claim 4, wherein a second parameter indicates a time period between detecting the DL communication and corresponding transmission of the ACK/NACK feedback for DL data, and wherein the second parameter is less than the first parameter.

7. The method of claim 6, wherein detecting the DL communication includes detecting a physical downlink shared channel (PDSCH) demodulation reference signal (DMRS) from the BS, and wherein transmitting the UL communication includes transmitting the UL communication in accordance with the second parameter in response to detecting the PDSCH DMRS.

8. The method of claim 6, wherein detecting the DL communication includes detecting a group-common (GC-PDCCH) from the BS, and wherein transmitting the UL communication includes transmitting the UL communication in accordance with the second parameter in response to detecting the GC-PDCCH.

9. The method of claim 6, wherein detecting the DL communication includes detecting a signal preamble from the BS, and wherein transmitting the UL communication includes transmitting the UL communication in accordance with the second parameter in response to detecting the signal preamble.

10. The method of claim 6, wherein a third parameter indicates a time period for preparation of the UL communication signal, and the third parameter is reduced based on at least one of channel type, resource allocation, or transport block size.

11. The method of claim 6, further comprising:
adapting the second parameter based on detecting the DL communication, wherein detecting the DL communication includes at least one of detecting a PDSCH DMRS from the BS, detecting a GC-PDCCH from the BS, or detecting a signal preamble from the BS.

12. The method of claim 1, wherein a fourth parameter indicates a time period between reception of an UL grant and corresponding transmission of UL data based on the UL grant.

13. The method of claim 12, wherein transmitting the UL communication signal includes transmitting during the second time period the UL communication signal in accordance with the fourth parameter.

14. The method of claim 12, wherein a fifth parameter indicates a time period between detecting the DL communication and corresponding transmission of UL data based on the scheduled grant, and wherein the fifth parameter is less than the fourth parameter.

15. The method of claim 14, wherein detecting the DL communication includes detecting a physical downlink channel (PDCCH) demodulation reference signal (DMRS) from the BS, and wherein transmitting the UL communication includes transmitting the UL communication in accordance with the fifth parameter in response to detecting the PDCCH DMRS.

16. The method of claim 14, wherein detecting the DL communication includes detecting one or more resource allocations for a current packet, and wherein transmitting the UL communication includes transmitting the UL communication in accordance with the fifth parameter in response to detecting the one or more resource allocations.

17. The method of claim 14, wherein detecting the DL communication includes detecting one or more transport blocks for a current packet, and wherein transmitting the UL communication includes transmitting the UL communication in accordance with the fifth parameter in response to detecting the one or more transport blocks.

18. The method of claim 1,
wherein the generating includes preparing, by the UE during the first time period, an UL packet based on the configured UL grant, and wherein transmitting the UL communication signal includes transmitting the UL packet during the second time period.

19. An apparatus, comprising:
a processor configured to:
 generate, during a first time period, an uplink (UL) communication signal based on a scheduled grant or a configured UL grant; and
 detect a downlink (DL) communication from a base station (BS) during a second time period after the first time period, wherein the DL communication is devoid of the scheduled grant and the configured UL grant; and
a transceiver configured to:
 transmit to the BS, the UL communication signal based on the scheduled grant or the configured UL grant in response to the detecting.

20. The apparatus of claim 19,
wherein the processor is configured to prepare, by the UE during the first time period, an UL packet of an ACK/NACK feedback based on receiving DL data based on the scheduled grant; and
wherein the transceiver is the configured to transmit the UL packet.

21. The apparatus of claim 19, wherein the first time period is within a first fixed frame period (FFP), and the second time period is within a second FFP different from the first FFP.

22. The apparatus of claim 19, wherein the DL communication is DL data,
wherein the processor is configured to decode, by the UE during the second time period, the DL data; and
wherein the transceiver is configured to transmit the UL communication signal in a time resource that is a first number of symbols after detection of the DL data in the second time period.

23. The apparatus of claim 19,
wherein the transceiver is configured to:
 receive, by the UE during the first time period, DL control information (DCI) indicating the scheduled grant, wherein the scheduled grant is an UL grant; and
 transmit an UL packet; and
wherein the processor is configured to prepare, by the UE during the first time period, the UL packet of UL data based on receiving the scheduled grant.

24. The apparatus of claim 19,
wherein the transceiver is configured to:
 receive, by the UE during the first time period, DCI indicating the scheduled grant,
wherein the scheduled grant is a DL grant; and
 receive, by the UE during the first time period, DL data based on the scheduled grant; and
wherein the processor is configured to prepare, by the UE during the first time period, an UL packet of an ACK/NACK feedback for the DL data.

25. A non-transitory computer-readable medium having program code recorded thereon, the program code comprising:
code for causing a user equipment (UE) during a first time period, to generate an uplink (UL) communication signal based on a scheduled grant or a configured UL grant;
code for causing the UE to detect a downlink (DL) communication from a base station (BS) during a second time period after the first time period, wherein the DL communication is devoid of the scheduled grant and the configured UL grant; and
code for causing the UE to transmit to the BS, the UL communication signal based on the scheduled grant or the configured UL grant in response to the detecting.

26. The non-transitory computer-readable medium of claim 25, the program code comprising:
code for causing the UE to decode the DCI during the second time period, wherein the code for causing the UE to transmit the UL communication signal includes code for causing the UE to transmit the UL communication signal in a time resource that is a second number of symbols after detecting the DCI in the second time period.

27. The non-transitory computer-readable medium of claim 25, wherein the code for causing the UE to generate the UL communication signal includes code for causing the UE to prepare, during the first time period, an UL packet based on the configured UL grant, and wherein the code for causing the UE to transmit the UL communication signal includes code for cause the UE to transmit the UL packet during the second time period.

28. An apparatus, comprising:
means for generating during a first time period, an uplink (UL) communication signal based on a scheduled grant or a configured UL grant;
means for detecting a downlink (DL) communication from a base station (BS) during a second time period after the first time period, wherein the DL communication is devoid of the scheduled grant and the configured UL grant; and means for transmitting to the BS, the UL communication signal based on the scheduled grant or the configured UL grant in response to the detecting.

29. The apparatus of claim 28, comprising:
means for receiving, during the first time period, DL control information (DCI) indicating the scheduled grant, wherein the scheduled grant is a DL grant; and
means for receiving, during the first time period, DL data based on the scheduled grant, wherein the generating includes preparing, by the UE during the first time period, an UL packet of an ACK/NACK feedback for the DL data.

30. The apparatus of claim 28, wherein the means for generating the UL communication signal includes means for preparing, during the first time period, an UL packet based on the configured UL grant, and wherein the means for transmitting the UL communication signal includes means for transmitting the UL packet during the second time period.

* * * * *